United States Patent
Fadida

(10) Patent No.: US 12,407,948 B2
(45) Date of Patent: Sep. 2, 2025

(54) IMAGING CIRCUITRY WITH HIGH FRAME RATE EDGE DETECTION

(71) Applicant: SEMICONDUCTOR COMPONENTS INDUSTRIES, LLC, Scottsdale, AZ (US)

(72) Inventor: Gal Fadida, Odem (IL)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 220 days.

(21) Appl. No.: 18/320,436

(22) Filed: May 19, 2023

(65) Prior Publication Data
US 2024/0388811 A1    Nov. 21, 2024

(51) Int. Cl.
| | |
|---|---|
| H04N 25/443 | (2023.01) |
| H04N 25/673 | (2023.01) |
| H04N 25/701 | (2023.01) |
| H04N 25/708 | (2023.01) |
| H04N 25/74 | (2023.01) |

(52) U.S. Cl.
CPC ......... *H04N 25/443* (2023.01); *H04N 25/673* (2023.01); *H04N 25/701* (2023.01); *H04N 25/708* (2023.01); *H04N 25/74* (2023.01)

(58) Field of Classification Search
None
See application file for complete search history.

(56) References Cited

U.S. PATENT DOCUMENTS

| | | | | |
|---|---|---|---|---|
| 2004/0017494 A1* | 1/2004 | Lu | ........................... | H04N 25/78 |
| | | | | 348/E3.018 |
| 2006/0012698 A1* | 1/2006 | Nitta | ....................... | H04N 25/78 |
| | | | | 348/E3.018 |

FOREIGN PATENT DOCUMENTS

| | | | | | |
|---|---|---|---|---|---|
| CN | 107300705 A | * | 10/2017 | ............. | G01S 17/36 |
| CN | 111314635 A | * | 6/2020 | ............. | H04N 5/374 |
| CN | 115665569 A | * | 1/2023 | | |
| EP | 4432688 A1 | * | 9/2024 | ............. | H04N 25/44 |
| WO | WO-2024135120 A1 | * | 6/2024 | | |

OTHER PUBLICATIONS

English translation of CN-107300705-A, Lei, 2017 (Year: 2017).*
English translation of CN-111314635-A, Liu, 2020 (Year: 2020).*
English translation of CN-115665569-A, Yang, 2023 (Year: 2023).*
(Continued)

*Primary Examiner* — James M Hannett
(74) *Attorney, Agent, or Firm* — Treyz Law Group, P.C.; Jason Tsai

(57) ABSTRACT

An image sensor may include an array of pixels arranged in rows and columns. Each pixel can include a subpixel circuit and one or more subtraction circuits. Each subpixel circuit can be selectively coupled to neighboring subpixel circuits in the same row via horizontal odd and even switches and can be selectively coupled to neighboring subpixel circuits in the same column via vertical odd and even switches. The horizontal and vertical switches can be turned on in separate phases to store difference values from pairs of neighboring subpixels into the one or more subtraction circuits. The difference values can be read out using comparators and one or more shift registers to output an edge image that includes only edge information.

19 Claims, 15 Drawing Sheets

(56) References Cited

OTHER PUBLICATIONS

English translation of WO-2024135120-A1, EiJi, 2024 (Year: 2024).*
M. Jin et al., "Design of an Edge-Detection CMOS Image Sensor with Built-in Mask Circuits", Sensors, 2020.
N. Takahashi et al., "A Row-Parallel Cyclic-Line-Access Edge Detection CMOS Image Sensor Employing Global Thresholding Operation", IEEE, 2010, p. 625-628.

* cited by examiner

IMAGING CIRCUITRY WITH HIGH FRAME RATE EDGE DETECTION

BACKGROUND

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

It is within this context that the embodiments described herein arise.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds or thousands or millions of pixels (e.g., megapixels). Image sensors may include control circuitry such as circuitry for operating the pixels and readout circuitry for reading out image signals corresponding to the electric charge generated by the photosensitive elements.

Figure 1:
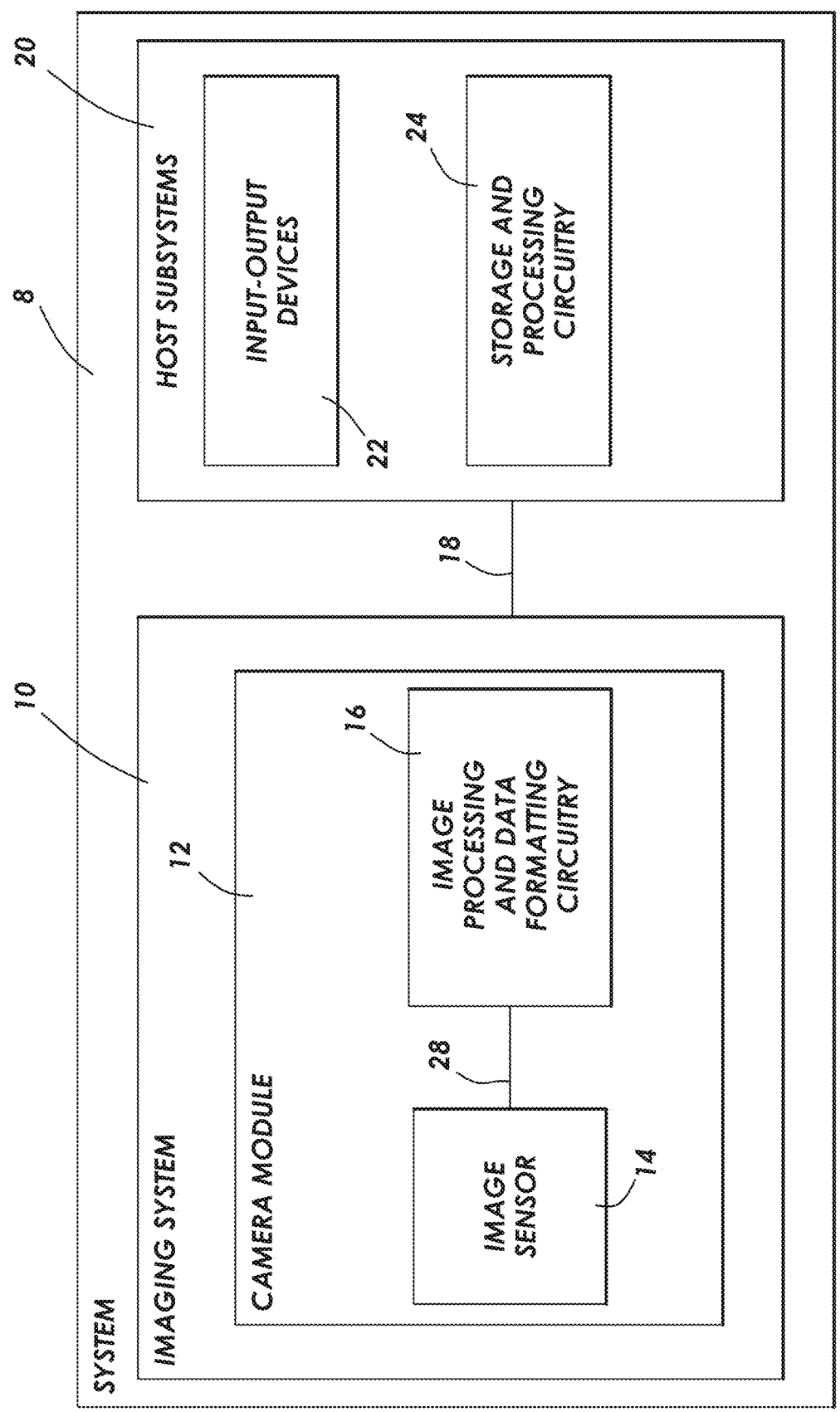
FIG. 1 is a diagram of an illustrative electronic device having an image sensor in accordance with some embodiments.

FIG. 1 is a diagram of an illustrative imaging and response system including an imaging system that uses an image sensor to capture images. System 8 of FIG. 1 may be an electronic device such as a camera, a cellular telephone, a video camera, or other electronic device that captures digital image data, may be a vehicle safety system (e.g., an active braking system or other vehicle safety system), may be a surveillance system, or part of an automated self-driving system.

As shown in FIG. 1, system 8 may include an imaging system such as imaging system 10 and host subsystems such as host subsystem 20. Imaging system 10 may include camera module 12. Camera module 12 may include one or more image sensors 14, such as in an image sensor array integrated circuit, and one or more lenses.

During image capture operations, each lens may focus light onto an associated image sensor 14. Image sensor 14 may include photosensitive elements (i.e., image sensor pixels) that convert the light into analog data. Image sensors may have any number of pixels (e.g., hundreds, thousands, millions, or more). A typical image sensor may, for example, have millions of pixels (e.g., megapixels).

Each image sensor in camera module 12 may be identical or there may be different types of image sensors in a given image sensor array integrated circuit. In some examples, image sensor 14 may further include bias circuitry (e.g., source follower load circuits), sample and hold circuitry, correlated double sampling (CDS) circuitry, amplifier circuitry, data output circuitry, memory (e.g., buffer circuitry), and/or address circuitry.

Still and video image data from sensor 14 may be provided to image processing and data formatting circuitry 16 via path 28. Image processing and data formatting circuitry 16 may be used to perform image processing functions such as data formatting, adjusting white balance and exposure, implementing video image stabilization, and/or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that have been stacked.

Imaging system 10 may convey acquired image data to host subsystem 20 over path 18. Host subsystem 20 may include input-output devices 22 and storage processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 8 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
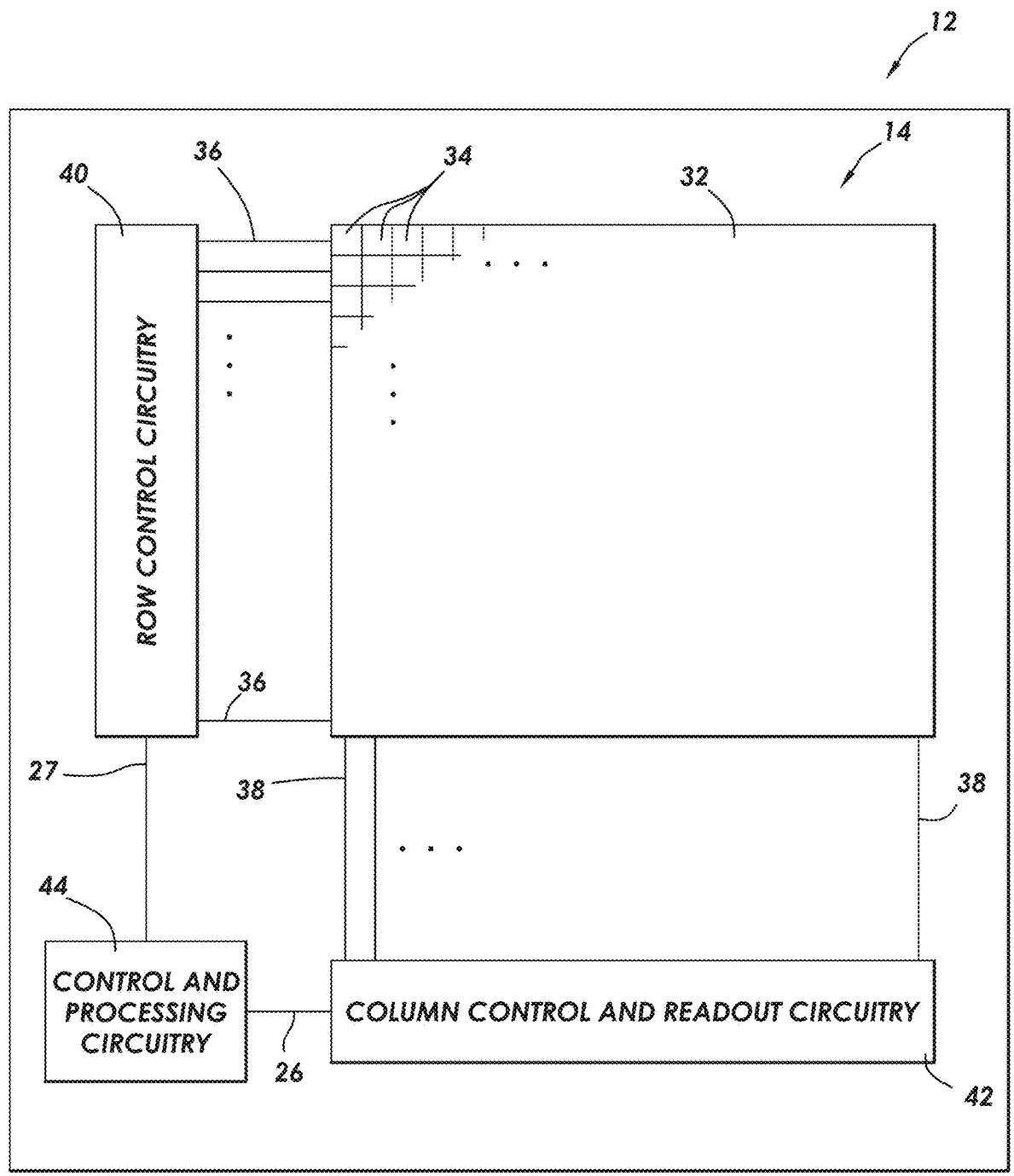
FIG. 2 is a diagram of an illustrative pixel array and associated row and column control circuitry for reading out image signals from an image sensor in accordance with some embodiments.

An example of an arrangement of image sensor 14 of FIG. 1 is shown in FIG. 2. As shown in FIG. 2, image sensor 14 may include control and processing circuitry 44. Control and processing circuitry 44 (sometimes referred to as control and processing logic) may be part of image processing and data formatting circuitry 16 in FIG. 1 or may be separate from circuitry 16. Image sensor 14 may include a pixel array such as array 32 of pixels 34 (sometimes referred to herein as image sensor pixels, imaging pixels, or image pixels). Control and processing circuitry 44 may be coupled to row control circuitry 40 via control path 27 and may be coupled to column control and readout circuitry 42 via data path 26.

Row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, or any other desired row pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. In some examples, each column of pixels may be coupled to a corresponding column line 38. For image pixel readout operations, a pixel row in image pixel array 32 may be selected using row driver circuitry 40 and image data associated with image pixels 34 of that pixel row may be read out by column readout circuitry 42 on column lines 38.

Column readout circuitry 42 can optionally include column circuitry such as column amplifiers for amplifying signals read out from array 32, sample and hold circuitry for sampling and storing signals read out from array 32, analog-to-digital converter circuits for converting read out analog signals to corresponding digital signals, and/or column memory for storing the readout signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure. Features described herein as rows may be arranged vertically and features described herein as columns may be arranged horizontally. The terms "row" and "column" referring to different dimensions of array 32 can sometimes be used interchangeably.

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements) may be used instead of green pixels in a Bayer pattern. These examples are merely illustrative and, in general, color filter elements of any desired color (e.g., cyan, yellow, red, green, blue, etc.) and in any desired pattern may be formed over any desired number of image pixels 34.

Figure 3:
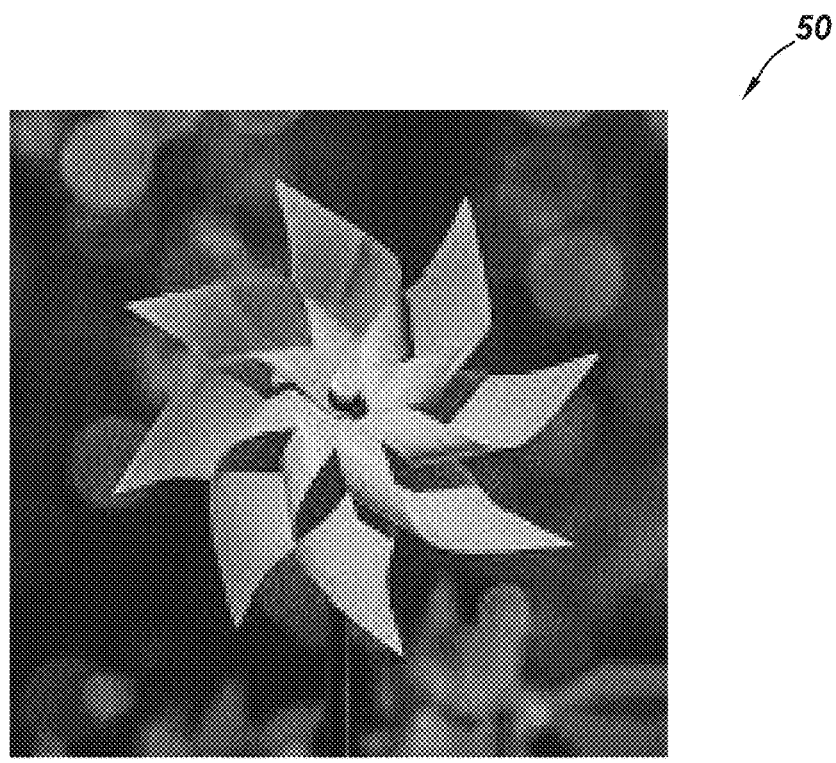
FIG. 3 is a diagram of a typical image that includes details in every pixel.

Conventionally, an image sensor can be used to acquire an image in which every pixel in the image includes some amount of information. FIG. 3 is a diagram of a typical image 50 that includes some level of detail in every pixel. As shown in FIG. 3, image 50 is a close-up image of a pinwheel. Each pixel in image 50 can include color and brightness information showing texture, shading, and highlights at the surface of the pinwheel and showing also blurred details in the background of the image that is out of focus. The file size of image 50 is directly dependent on overall size of the image array, which is a function of the number of rows and columns in the array. The readout speed for image 50 is also dependent on the requisite dynamic range of the image array, as it takes time to perform the analog-to-digital conversion to convert the captured color and brightness information into digital values.

Figure 4:
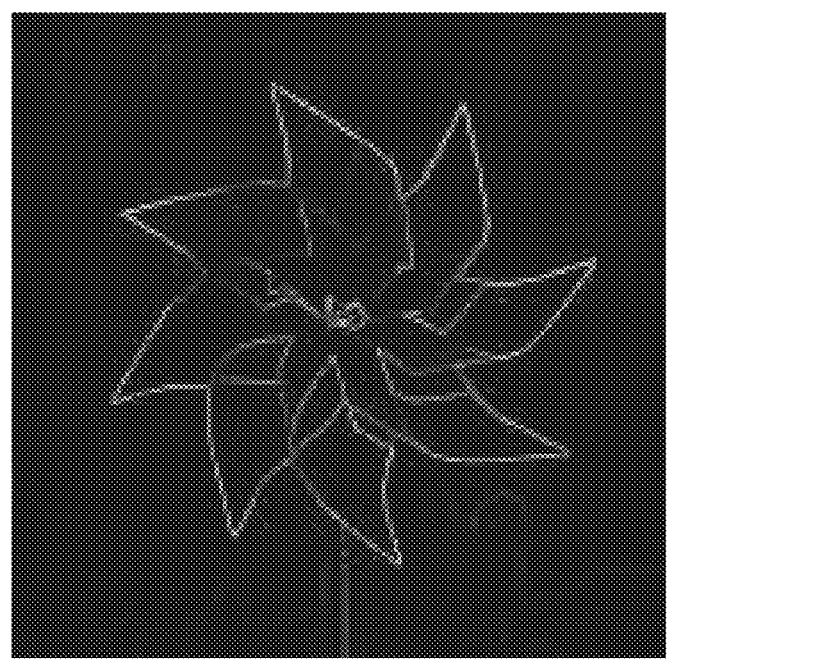
FIG. 4 is a diagram of an illustrative image that include only edge information in accordance with some embodiments.

In accordance with some embodiments, an image sensor 14 is provided that is configured to acquire an image that includes only edge information. FIG. 4 is a diagram of an illustrative image 52 that includes only edge information. As shown in FIG. 4, image 52 shows relevant details of only the edges in the captured scene. For example, an "edge" can be defined as the border between two image regions where the color and/or brightness differential is high. In the example of FIG. 4, image 52 shows only white or gray pixels at some of the more detectable or discernable edges of the pinwheel while the rest of image 52 is completely black. Such image 52 that includes only edge information is sometimes referred to and defined herein as an "edge image." While image 50 of FIG. 3 can be a color image, edge image 52 may be a grayscale (or monochrome) image.

As shown by edge image 52, edge information is relatively sparse in the sense that the majority of the content in most images is not an edge. Conventional edge detection schemes reads an entire image such as image 50, processes that image 50, and then discards the vast majority of the image information that do not qualify as an edge. Such conventional approach of generating an edge image is extremely wasteful and has limited throughput. It would therefore be desirable to provide an improved methodology of generating edge images.

In accordance with some embodiments, image sensor 14 is provided that is capable of generating an edge image by only extracting the edge information (e.g., only edges have non-zero readout values while non-edges have zero readout values). The edge information can be detected in the analog domain by using in-pixel computation (e.g., using in-pixel subtraction and storage). This technique of extracting and computing only the edge information in the analog domain is technically advantageous and beneficial as it enables an extremely high frame rate readout scheme with minimal or without needing any analog-to-digital conversion and additional digital processing. For example, the techniques disclosed herein can enable output of edge images at over 100 frames per second (fps), at over 500 fps, 500-1000 fps, or over 1000 fps.

Figure 5:
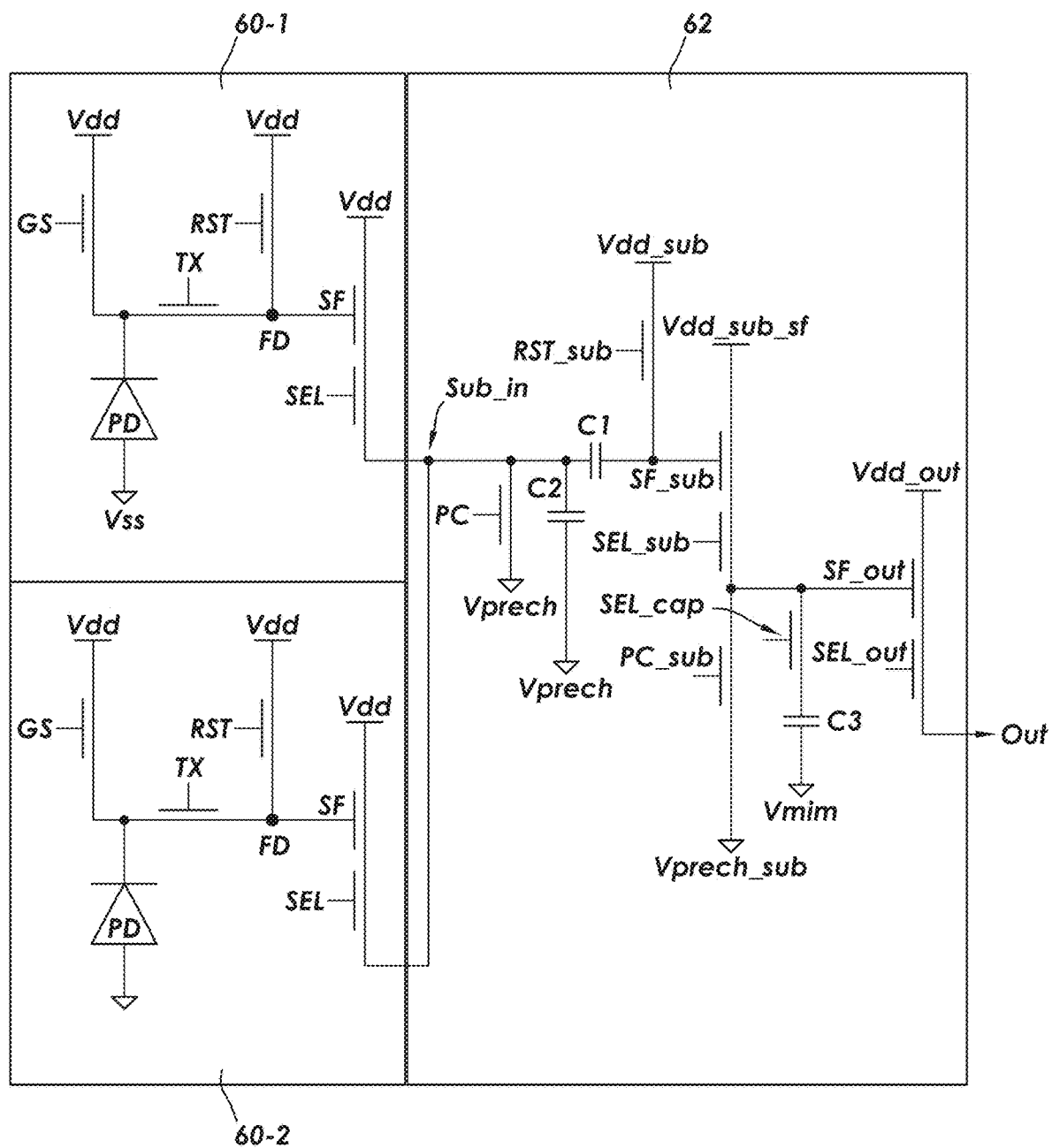
FIG. 5 is a circuit diagram showing two subpixels coupled to a subtraction circuit in accordance with some embodiments.

To support extraction of edge information, image pixels can include a subpixel portion and an in-pixel subtraction portion. FIG. 5 is a circuit diagram showing two subpixel circuits 60-1 and 60-2 coupled to a subtraction circuit 62. As shown in FIG. 5, each subpixel circuit 60 (e.g., subpixel 60-1 and subpixel 60-2) can include a photosensitive element such as photodiode PD, a global shutter switch such as global shutter transistor GS, a charge transfer switch such as charge transfer transistor TX, a reset switch such as reset transistor RST, a source follower such as source follower transistor SF, and a row select switch such as row select transistor SEL.

The global shutter transistor GS can have a drain terminal coupled to a positive power supply line (e.g., a power supply terminal on which positive power supply voltage Vdd is provided), a source terminal coupled to a cathode of photodiode PD, and a gate terminal configured to receive a global shutter control signal. The terms "source" and "drain" are sometimes used interchangeably when referring to current-conducting terminals of a metal-oxide-semiconductor transistor. The source and drain terminals are therefore sometimes referred to as "source-drain" terminals (e.g., a transistor has a gate terminal, a first source-drain terminal, and a second source-drain terminal). Photodiode PD may have an anode terminal coupled to a ground line (e.g., a ground power supply line on which ground voltage Vss is provided).

The charge transfer transistor TX may have a first source-drain terminal coupled to the cathode of photodiode PD, a second source-drain terminal coupled to floating diffusion node (region) FD, and a gate terminal configured to receive a transfer gate control signal. The reset transistor RST may have a drain terminal coupled to the positive power supply voltage Vdd, a source terminal coupled to floating diffusion node FD, and a gate terminal configured to receive a reset signal. The source follower transistor SF may have a gate terminal coupled to floating diffusion node FD, a drain terminal coupled to the positive power supply voltage Vdd, and a source terminal. The row select transistor SEL may have a drain terminal coupled to the source terminal of source follower SF, a gate terminal configured to receive a row select control signal, and a source terminal coupled to an input node Sub_in of subtraction circuit 62. The pixel structure of subpixels 60-1 and 60-2 can both have this structure, which is exemplary. If desired, each subpixel circuit 60 can include more or fewer switches, one or more capacitors, one or more storage gates, one or more storage nodes, and/or other pixel-level imaging components.

Subtraction circuit 62 can include precharge switches such as precharge transistors PC and PC_sub, capacitive components such as capacitors C1, C2, and C3, a reset switch such as subtraction circuit reset transistor RST_sub, a source follower such as subtraction circuit source follower transistor SF_sub, a row select switch such as subtraction circuit row select transistor SEL_sub, a capacitor selection switch such as capacitor selection transistor SEL_cap, another source follower such as output circuit source follower transistor SF_out, and another source row select switch such as output circuit row select transistor SEL_out.

Precharge transistor PC may have a drain terminal coupled to input node Sub_in, a source terminal coupled to another ground line (e.g., a precharge line on which precharge voltage Vprech is provided), and a gate terminal configured to receive a first precharge control signal. Precharge voltage Vprech can be equal to or different than ground voltage Vss. Capacitor C2 may have a first terminal coupled to input node Sub_in and a second terminal configured to receive precharge voltage Vprech. Capacitor C1 may have a first terminal coupled to input node Sub_in and a second terminal. Transistor RST_sub may have a drain terminal coupled to another positive power supply line (e.g., a positive power supply terminal on which positive power supply voltage Vdd_sub is provided), a source terminal coupled to the second terminal of C1, and a gate terminal configured to receive another reset control signal. Power supply voltage Vdd_sub can be equal to or different than subpixel power supply voltage Vdd.

Transistor SF_sub may have a drain terminal coupled to another positive power supply line (e.g., a positive power supply terminal on which positive power supply voltage Vdd_sub_sf is provided), a source terminal, and a gate terminal that is coupled to the second terminal of capacitor C1. Power supply voltage Vdd_sub_sf can be equal to or different than Vdd or Vdd_sub. Transistor SEL_sub may have a drain terminal coupled to the source terminal of transistor SF_sub, a source terminal, and a gate terminal configured to receive another select signal. Transistor PC_sub may have a drain terminal coupled to the source terminal of transistor SEL_sub, a source terminal coupled to another ground line (e.g., a precharge line on which precharge voltage Vprech_sub is provided), and a gate terminal configured to receive another precharge control signal. Precharge voltage Vprech_sub can be equal to or different than ground voltage Vss or precharge voltage Vprech.

Transistor SEL_cap may have a drain terminal coupled to the drain terminal of transistor PC_sub, a gate terminal configured to receive a capacitor selection control signal, and a source terminal coupled to capacitor C3. Capacitor C3 may have a first terminal coupled to transistor SEL_cap and a second terminal coupled to another ground line (e.g., a ground power supply line on which ground voltage Vmim is provided). Capacitor C3 is sometimes referred to as a storage capacitor or memory capacitor. Voltage Vmim can be equal to or different than Vss, Vprech, or Vprech_sub.

Transistor SF_out may have a drain terminal coupled to another positive power supply line (e.g., a positive power supply terminal on which positive power supply voltage Vdd_out is provided), a source terminal, and a gate terminal that is coupled to the source terminal of transistor SEL_sub. Power supply voltage Vdd_out can be equal to or different than Vdd, Vdd_sub, or Vdd_sub_sf. Transistor SEL_out may have a drain terminal coupled to the source terminal of transistor SF_out, a gate terminal configured to receive another select signal, and a source terminal coupled to a subtraction circuit output port Out. The structure of subtraction circuit 62 as shown in FIG. 5 is exemplary. If desired, subtraction circuit 62 can include more or fewer switches, one or more capacitors, one or more storage nodes, and/or other components.

Figure 6:
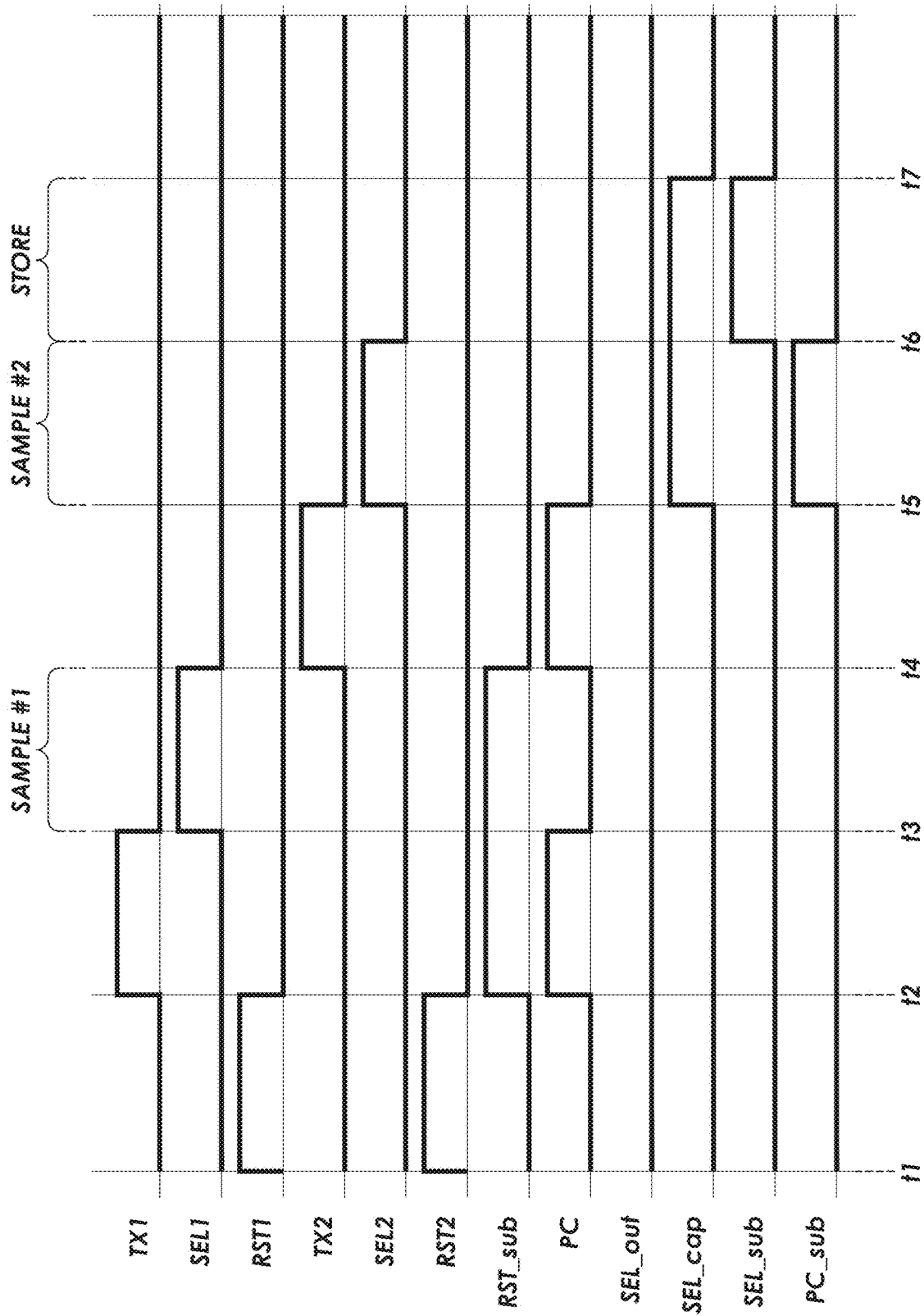
FIG. 6 is a timing diagram illustrating the operation of the circuitry shown in FIG. 5 in accordance with some embodiments.

FIG. 6 is a timing diagram illustrating the operation of the circuitry shown in FIG. 5 in accordance with some embodiments. TX1 may refer to the charge transfer transistor of the first subpixel 60-1, whereas TX2 may refer to the charge transfer transistor in the second subpixel 60-2. SEL1 may refer to the row select transistor of the first subpixel 60-1, whereas SEL2 may refer to the row select transistor in the second subpixel 60-2. RST1 may refer to the reset transistor of the first subpixel 60-1, whereas RST2 may refer to the reset transistor in the second subpixel 60-2.

From time t1 to t2, reset transistors RST1 and RST2 can be turned on (activated) to reset the floating diffusion nodes of both subpixels to the reset value. This period is sometimes referred to as a reset phase. Unlike conventional correlated double sampling (CDS) readouts, this reset value is not relevant for edge detection. The reset value of both subpixels 60-1 and 60-2 can be ignored (e.g., fine precision is not needed for edge detection).

At time t2, transistors RST1 and RST2 are turned off (deactivated) while charge transfer transistor TX1, reset transistor RST_sub, and precharge transistor PC are all turned on. During this time, the accumulated charge in subpixel 60-1 is transferred to its FD node while node Sub_in is precharged to Vprech and while the storage node in subtraction circuit 62 is being reset by transistor RST_sub.

At time t3, transistors TX1 and PC are turned off while transistor SEL1 is turned on. During this time, the image signal from the first subpixel 60-1 is read out and sampled at the input of subtraction circuit 62. The time period from time t3 to time t4 is therefore sometimes referred to as a first sampling phase.

At time t4, transistors SEL1 and RST_sub are turned off (deactivated) while charge transfer transistor TX2 and precharge transistor PC are turned on. During this time, the accumulated charge in subpixel 60-2 is transferred to its FD node while node Sub_in is precharged to Vprech. Since transistor RST_sub is turned off, the right terminal of capacitor C1 is electrically floating, so the voltage across capacitor C1 cannot change during this time. Thus, the prior sampled value for the first subpixel 60-1 is still stored across capacitor C1 even as the left terminal of capacitor C1 is being precharged to Vprech. This time this, a difference value between the first and second sampled values can be sampled across capacitor C1. Capacitor c1 is therefore sometimes referred to as a sampling capacitor. Circuit 62 operated in this way effectively leverages the CDS scheme to subtract the image signals read out from the two subpixel portions. In other words, circuit 62 can be used to perform in-pixel subtraction in the analog domain, which is the foundational computation required for fast edge detection.

At time t5, transistors TX2 and PC are turned off while transistor SEL2 is turned on. Transistors SEL_cap and PC_sub are also turned on at time t5. During this time, the image signal from the second subpixel 60-2 can be read out and sampled at the input of subtraction circuit 62. The time period from time t5 to time to is therefore sometimes referred to as a second sampling phase. Turning on transistors SEL_cap and PC_sub during the second sampling phase resets the charge on memory capacitor C3 to Vprech_sub.

At time t6, transistors SEL2 and PC_sub are turned off while transistor SEL_sub is turned on. Turning on transistor SEL_sub reads out the difference value and stores the difference value onto the memory capacitor C3. This time period from time t6 to t7 is therefore sometimes referred to as a difference value storage phase.

Figure 7:
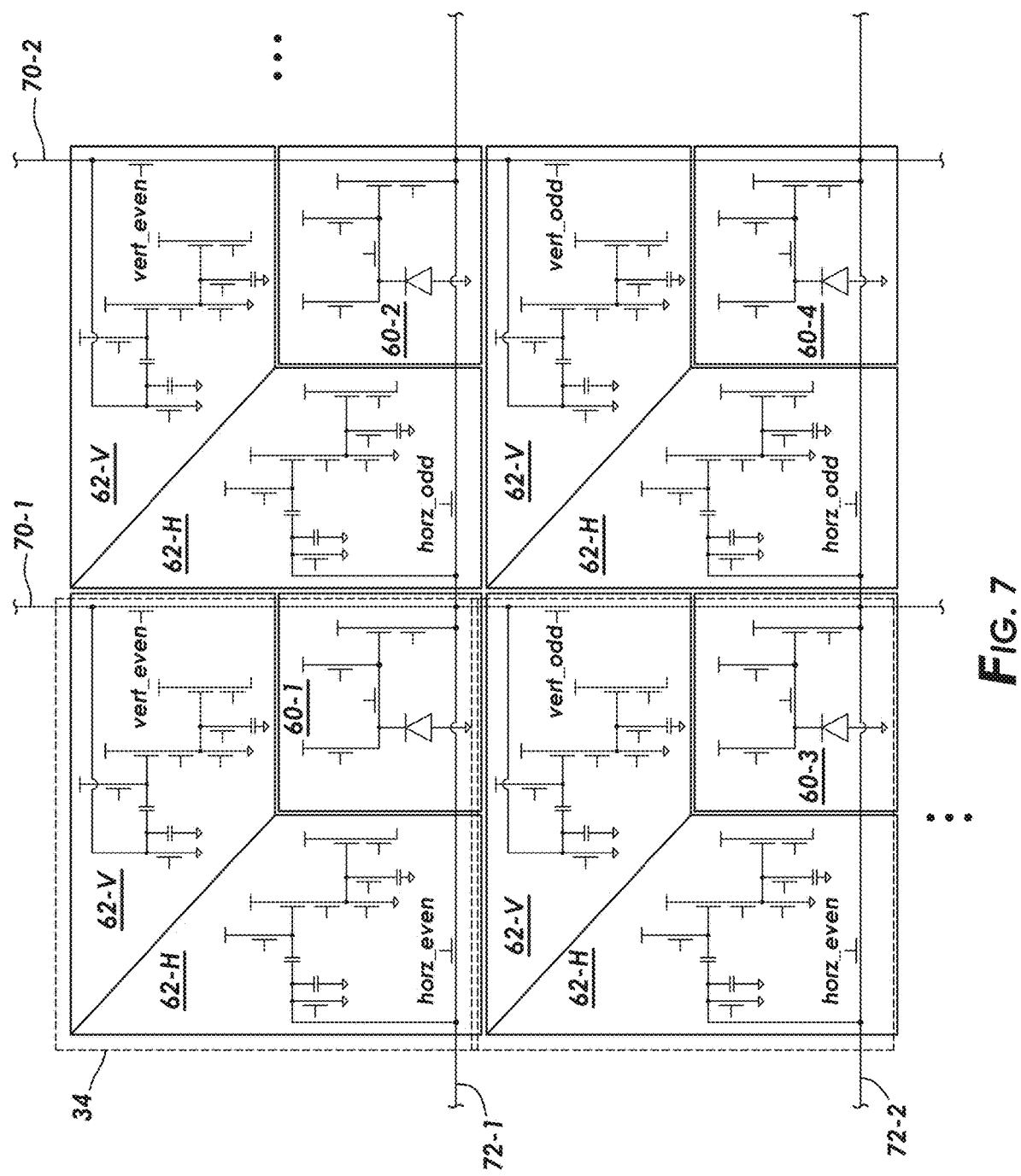
FIG. 7 is a circuit diagram showing an array of pixels each having a subpixel and two associated subtraction circuits in accordance with some embodiments.

Two neighboring subpixels can be coupled to respective subtraction circuits in both horizontal and vertical directions to perform a continuous network of subtraction or difference operations. FIG. 7 is a circuit diagram showing an array of pixels 34 each having one subpixel 60 and two associated subtraction circuits such as a horizontal subtraction circuit 62-H and a vertical subtraction circuit 62-V. In general, the term "pixel" can refer to or be defined herein as a pixel circuit that includes one or more subpixel portions 60 and one or more subtraction circuit portions 62. The example of FIG. 7 shows a first row of pixels 34 having subpixels 60-1 and 60-2 and a second row of pixels 34 having subpixels 60-3 and 60-4.

Subpixels 60-1 and 60-2 in the first row in FIG. 7 may be coupled to a first horizontal (row) signal line 72-1, whereas subpixels 60-3 and 60-4 in the second row in FIG. 7 may be coupled to a second horizontal (row) signal line 72-2. Horizontal signal line 72-1 may be selectively coupled to the input nodes of horizontal subtraction circuits 62-H in the pixels of the first row via switches horz_even and horz_odd (e.g., the horz_even and horz_odd switches are alternately disposed alone line 72-1). Similarly, horizontal signal line 72-2 may be selectively coupled to the input nodes of horizontal subtraction circuits 62-H in the pixels of the second row via switches horz_even and horz_odd (e.g., the horz_even and horz_odd switches are alternately disposed alone line 72-2). In particular, each subtraction circuit 62-H in the odd columns can be coupled to a neighboring subtraction circuit 62-H in a respective even column via an even horizontal switch horz_even, whereas each subtraction circuit 62-H in the even columns can be coupled to a neighboring subtraction circuit 62-H in a respective odd column via an odd horizontal switch horz_odd.

Subpixels 60-1 and 60-3 in the column row in FIG. 7 may be coupled to a first vertical (column) signal line 70-1, whereas subpixels 60-2 and 60-4 in the second column of FIG. 7 may be coupled to a second vertical (column) signal line 70-2. Vertical signal line 70-1 may be selectively coupled to the input nodes of vertical subtraction circuits 62-V in the pixels of the first column via switches vert_even and vert_odd. Similarly, vertical signal line 70-2 may be selectively coupled to the input nodes of the vertical subtraction circuits 62-V in the pixels of the second column via switches vert_even and vert_odd. In particular, each subtraction circuit 62-V in the odd rows can be coupled to a neighboring subtraction circuit 62-V in a respective even row via an even vertical switch vert_even, whereas each subtraction circuit 62-V in the even rows can be coupled to a neighboring subtraction circuit 62-V in a respective odd row via an odd vertical switch vert_odd. In other words, the vert_even and vert_odd switches can be alternately disposed along the vertical signal column lines 70-1 and 70-2.

The array of FIG. 7 showing a 2×2 array of four pixels 34 is illustrative and can be repeated across in the row-wise and column-wise directions. In general, the image sensor can include pixels 34 arranged into any number of rows and any number of columns (e.g., the image sensor array can include hundreds or thousands of rows and hundreds or thousands of columns). Each row of pixels can be coupled to a horizontal (row) signal line 72 with interspersed horz_even and horz_odd switches selectively coupling together neighboring subtraction circuits 62-H. Each column of pixels can be coupled to a vertical (column) signal line 70 with interspersed vert_even and vert_odd switches selectively coupling together neighboring subtraction circuits 62-V. The horizontal and vertical switches can be driven in a one-hot fashion (e.g., only one of switches horz_even, horz_odd, vert_even, and vert_odd can be activated at any point in time).

Figure 8:
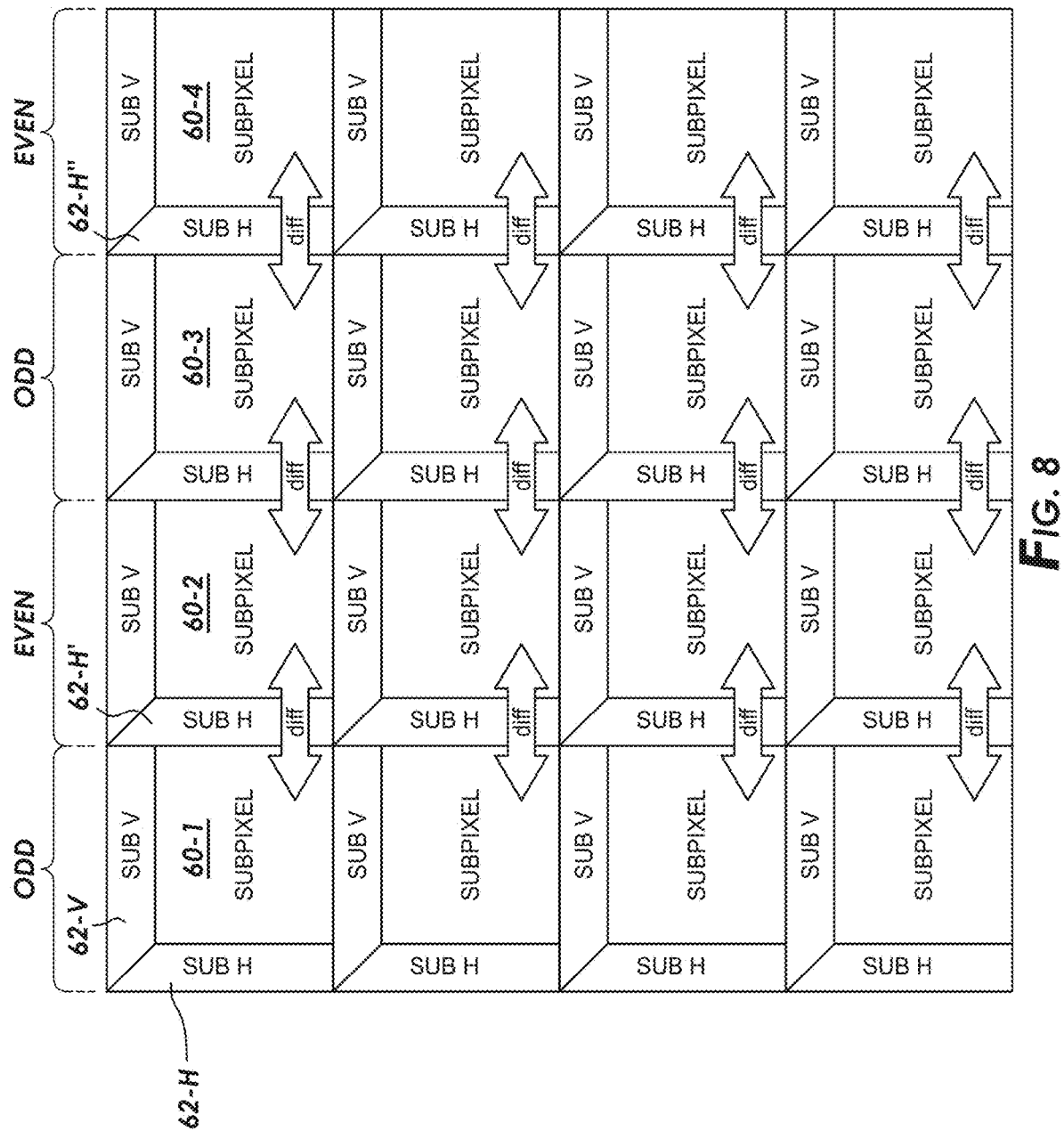
FIG. 8 is a diagram illustrating a first phase for computing a difference at the even horizontal edges in accordance with some embodiments.

A pixel array of the type shown in FIG. 7 can be configured to perform a global difference and storage operation by performing a continuous network of subtractions with moving boundaries via a four phase operation. FIG. 8 is a diagram illustrating a first phase for computing a difference at the even horizontal edges of the network. As shown in FIG. 8, the horz_odd switches can be turned on (activated) to couple together associated neighboring subpixels (e.g., to compute a difference value around all the horizontal even edges and to store the resulting difference in the memory capacitor of the right subtraction circuit 62-H in each pixel pair). For example, a first pixel value from subpixel 60-1 and a second pixel value from subpixel 60-2 in the first row of FIG. 8 can both be coupled to subtraction circuit 62-H' associated with the right subpixel 60-2 and the resulting difference between the first and second pixel values will be stored within that subtraction circuit 62-H'. Simultaneously, a third pixel value from subpixel 60-3 and a fourth pixel value from subpixel 60-4 in the first row of FIG. 8 can both be coupled to the right subtraction circuit 62-H" associated with subpixel 60-4 and the resulting difference between the third and fourth pixel values will be stored within that subtraction circuit 62-H". This in-pixel subtraction and difference storage scheme can be repeated across the entire array in a parallel fashion.

Figure 9:
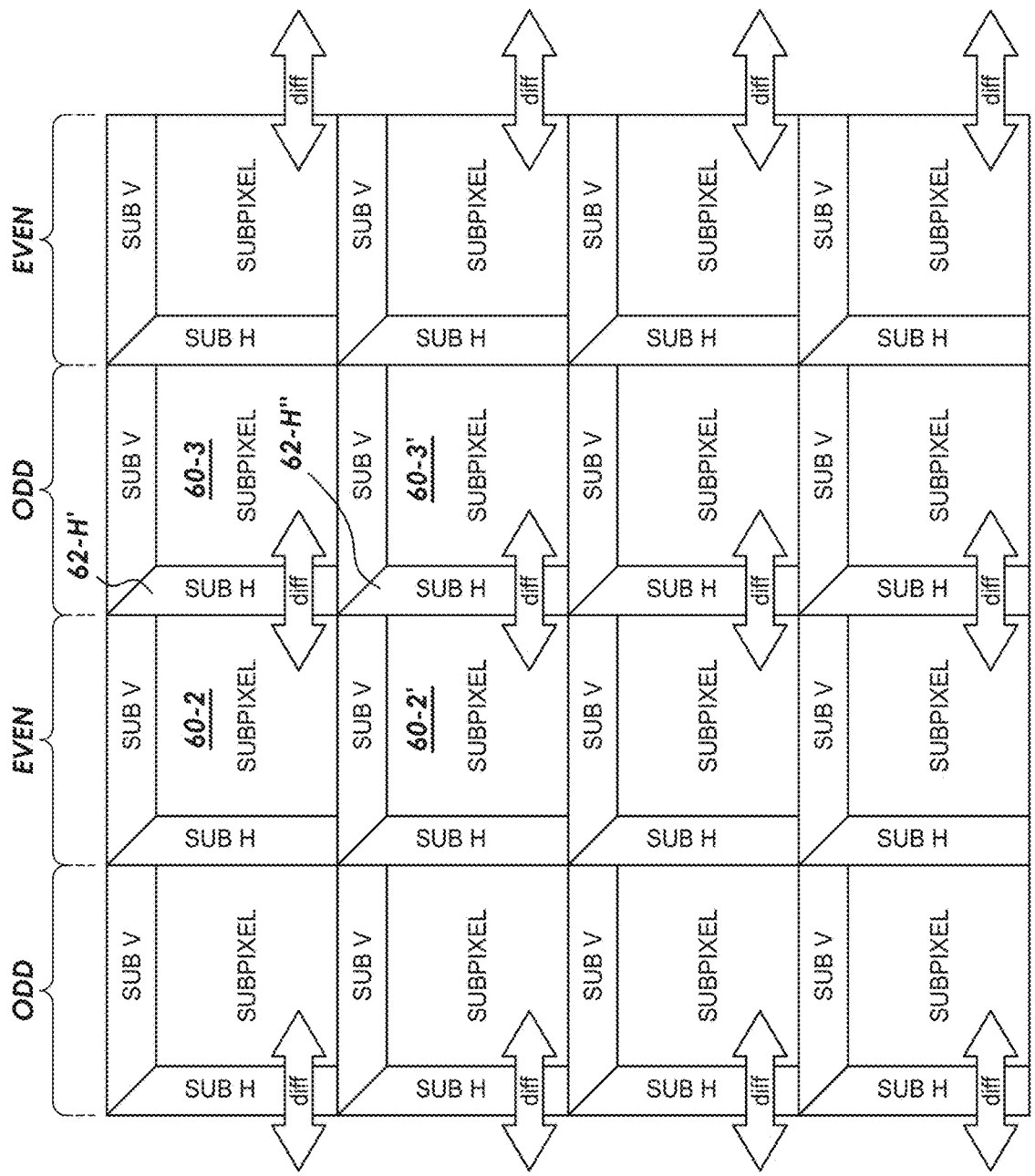
FIG. 9 is a diagram illustrating a second phase for computing a difference at the odd horizontal edges in accordance with some embodiments.

FIG. 9 is a diagram illustrating a second phase for computing a difference at the odd horizontal edges of the network. As shown in FIG. 9, the horz_even switches can be turned on (activated) to couple together associated neighboring subpixels (e.g., to compute a difference value around all the horizontal odd edges and to store the resulting difference in the memory capacitor of the right subtraction circuit 62-H in each pixel pair). For example, a first pixel value from subpixel 60-2 and a second pixel value from subpixel 60-3 in the first row of FIG. 9 can both be coupled to subtraction circuit 62-H' associated with the right subpixel 60-3 and the resulting difference between the first and second pixel values will be stored within that subtraction circuit 62-H'. Simultaneously, a third pixel value from subpixel 60-2' and a fourth pixel value from subpixel 60-3' in the second row of FIG. 9 can both be coupled to the right subtraction circuit 62-H" associated with subpixel 60-3' and the resulting difference between the third and fourth pixel values will be stored within that subtraction circuit 62-H". This in-pixel subtraction and difference storage scheme can be repeated across the entire array in a parallel fashion.

Figure 10:
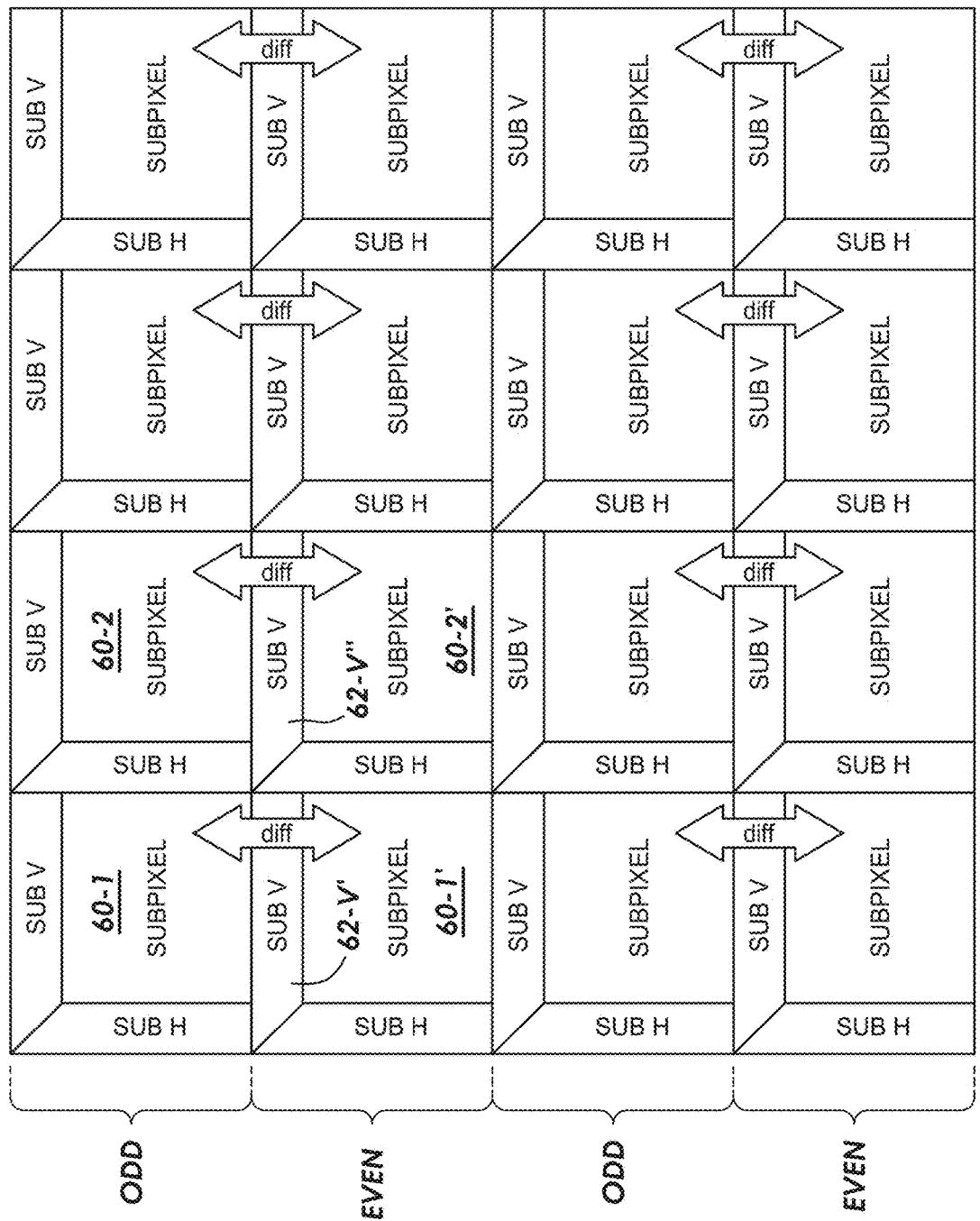
FIG. 10 is a diagram illustrating a third phase for computing a difference at the even vertical edges in accordance with some embodiments

FIG. 10 is a diagram illustrating a third phase for computing a difference at the even vertical edges of the network. As shown in FIG. 10, the vert_odd switches can be turned on (activated) to couple together associated neighboring subpixels (e.g., to compute a difference value around all the vertical even edges and to store the resulting difference in the memory capacitor of the lower subtraction circuit 62-V in each pixel pair). For example, a first pixel value from subpixel 60-1 and a second pixel value from subpixel 60-1' in the first column of FIG. 10 can both be coupled to the lower subtraction circuit 62-V' associated with subpixel 60-1' and the resulting difference between the first and second pixel values will be stored within that subtraction circuit 62-V'. Simultaneously, a third pixel value from subpixel 60-2 and a fourth pixel value from subpixel 60-2' in the second column of FIG. 10 can both be coupled to the lower subtraction circuit 62-V" associated with subpixel 60-2' and the resulting difference between the third and fourth pixel values will be stored within that subtraction circuit 62-V". This in-pixel subtraction and difference storage scheme can be repeated across the entire array in a parallel fashion.

Figure 11:
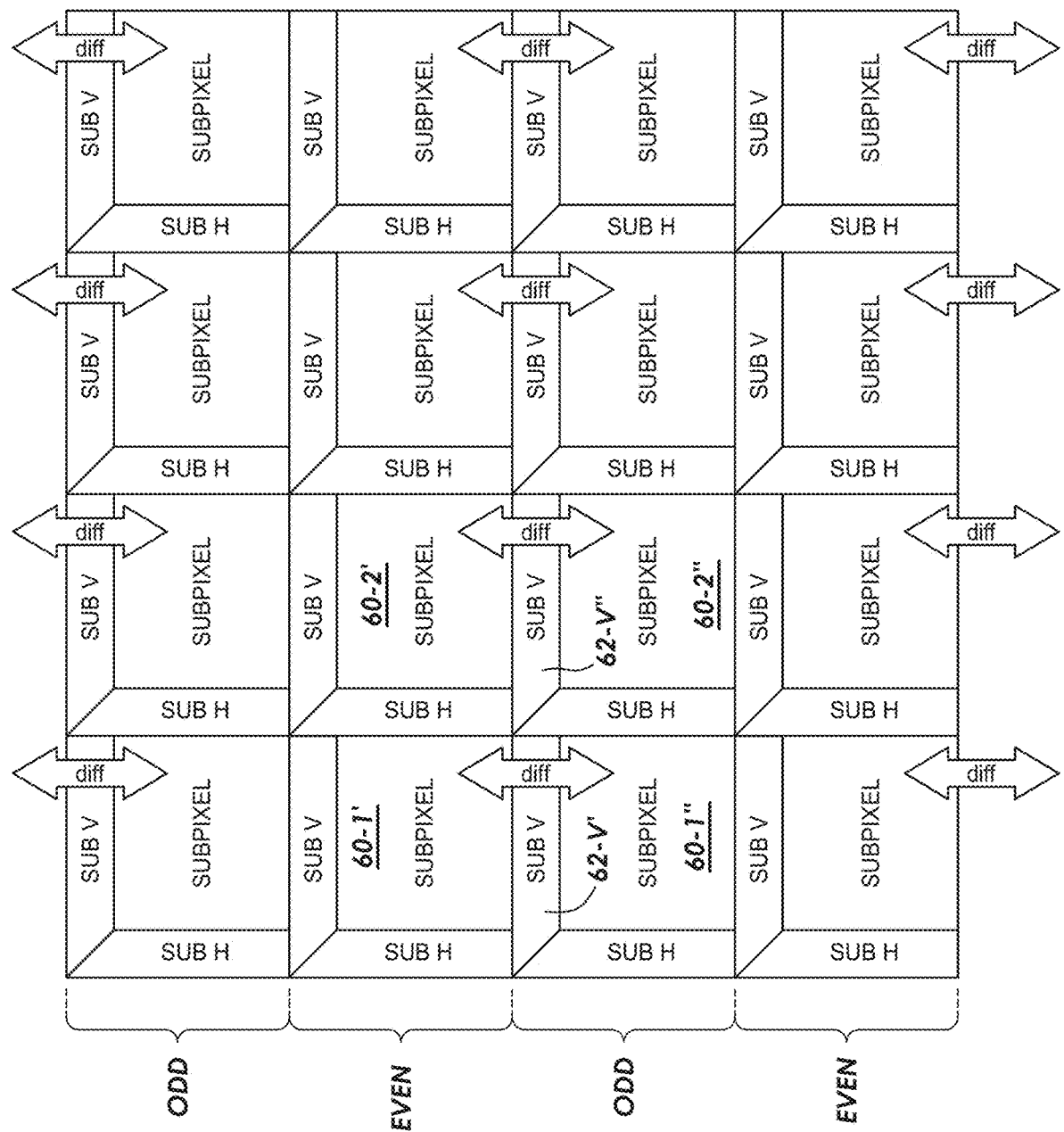
FIG. 11 is a diagram illustrating a fourth phase for computing a difference at the odd vertical edges in accordance with some embodiments

FIG. 11 is a diagram illustrating a fourth phase for computing a difference at the odd vertical edges of the network. As shown in FIG. 11, the vert_even switches can be turned on (activated) to couple together associated neighboring subpixels (e.g., to compute a difference value around all the vertical odd edges and to store the resulting difference in the memory capacitor of the lower subtraction circuit 62-V in each pixel pair). For example, a first pixel value from subpixel 60-1' and a second pixel value from subpixel 60-1" in the first column of FIG. 11 can both be coupled to subtraction circuit 62-V' associated with the lower subpixel 60-1" and the resulting difference between the first and second pixel values will be stored within that subtraction circuit 62-V'. Simultaneously, a third pixel value from subpixel 60-2' and a fourth pixel value from subpixel 60-2" in the second column of FIG. 11 can both be coupled to subtraction circuit 62-V" associated with the lower subpixel 60-2" and the resulting difference between the third and fourth pixel values will be stored within that subtraction circuit 62-V". This in-pixel subtraction and difference storage scheme can be repeated across the entire array in a parallel fashion.

The four phases shown in FIGS. 8-11 can be performed in any order until a subtraction (difference) value from all horizontal neighboring subpixels and all vertical neighboring subpixels haven been stored in a corresponding memory capacitor (sec, e.g., C3 in FIG. 5) of each horizontal subtraction circuit 62-H and each vertical subtraction circuit 62-V. If desired, subtraction values around the horizontal odd edges can be computed prior to the horizontal even edges. If desired, subtraction values around the vertical odd edges can be computed prior to the vertical even edges. If desired, subtraction values for the vertical edges can be computed prior to the horizontal edges.

Figure 12:
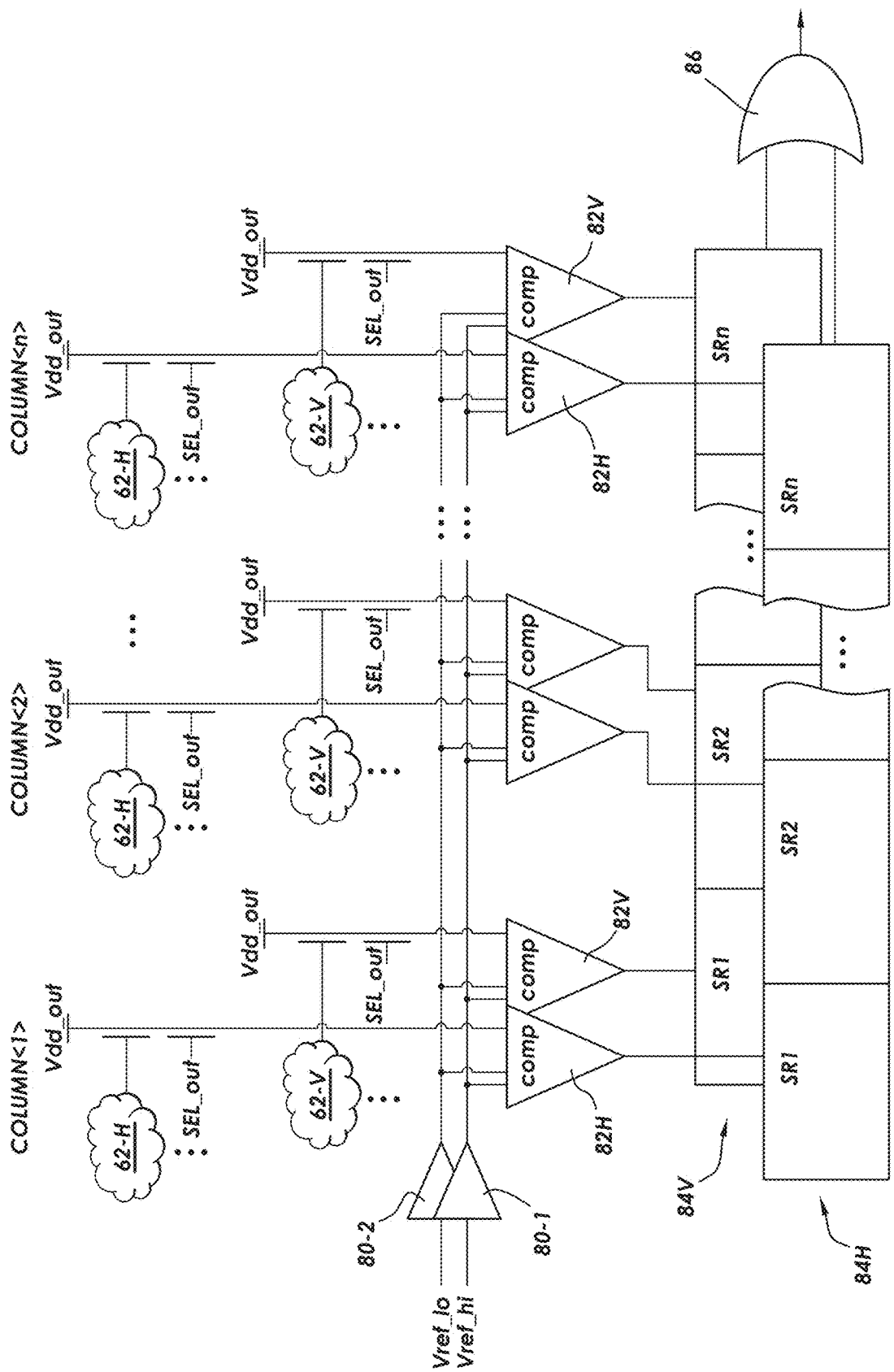
FIG. 12 is a diagram of illustrative edge detection readout circuitry configured to operate with the array of pixels of the type shown in FIGS. 7-11 in accordance with some embodiments.

FIG. 12 is a diagram of illustrative edge detection readout circuitry configured to operate with the array of pixels 34 of the type shown in FIGS. 7-11 in accordance with some embodiments. As shown in FIG. 12, the edge detection readout circuitry can include a plurality of comparator circuits such as horizontal comparators 82H and vertical comparators 82V, voltage buffers such as reference voltage buffers 80-1 and 80-2, shift register circuits such as horizontal shift register 84H and vertical shift register 84V, and a logic gate such as logic OR gate 86. Voltage buffer 80-1 may be configured to output (drive) a high reference voltage Vref_hi, whereas voltage buffer 80-2 may be configured to output (drive) a low reference voltage Vref_lo.

Each horizontal comparator 82H may have a first input configured to receive difference values from multiple subtraction circuits 62-H in a sequential fashion, a second input configured to receive reference voltage Vref_hi from voltage buffer 80-1, a third input configured to receive reference voltage Vref_lo from voltage buffer 80-2, and an output coupled to a respective register in horizontal shift register 84H. Configured in this way, each horizontal comparator 82H can receive the stored difference values from subtraction circuits 62-H in a corresponding column, reference voltage Vref_hi, and reference voltage Vref_lo. Each vertical comparator 82V may have a first input configured to receive difference values from multiple subtraction circuits 62-V in a sequential fashion, a second input configured to receive reference voltage Vref_hi from voltage buffer 80-1, a third input configured to receive reference voltage Vref_lo from voltage buffer 80-2, and an output coupled to a respective register in vertical shift register 84V. Configured in this way, each vertical comparator 82V can receive the stored difference values from subtraction circuits 62-V in a corresponding column, reference voltage Vref_hi, and reference voltage Vref_lo.

Logic OR gate 86 may have a first input coupled to an output of horizontal shift register 84H and a second input coupled to an output of vertical shifter register 84V. Configured in this way, comparator output values from shift registers 84H and 84V can be shifted out in a lock step fashion, and logic OR gate 86 outputting a logic "1" will be indicative of the presence of a detected edge whereas outputting a logic "0" will be indicative of the lack of a detected edge. Each pixel 34 can contain two bits of information (e.g., one horizontal edge and one vertical edge). For edge detection, a single output bit is sufficient per direction. Detecting and reading out edge information in this way does not require any high resolution analog-to-digital converters and complex digital processing and can thus enable operations of up to 1000 frames per second or more.

Figure 13:
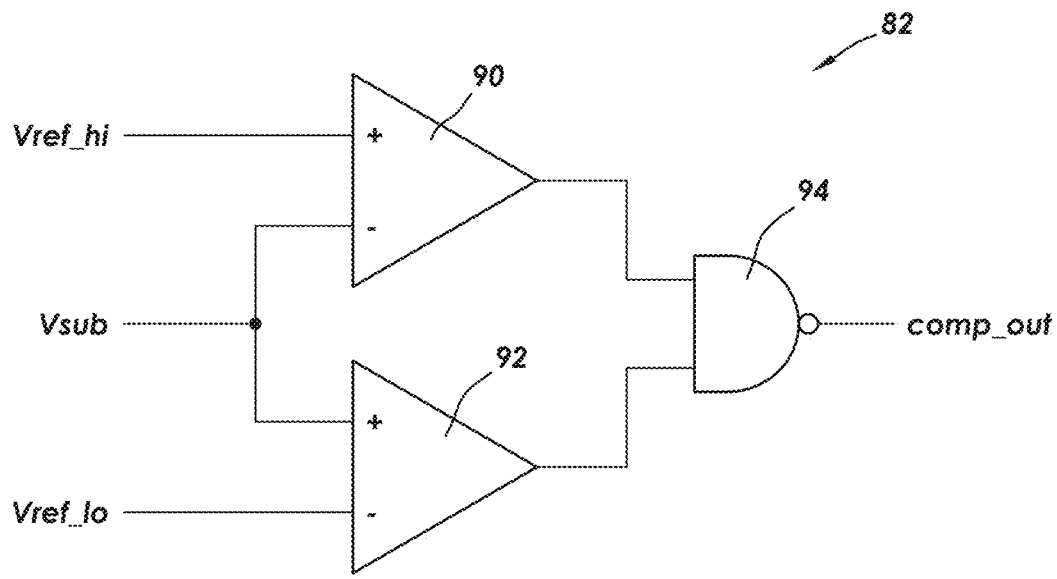
FIG. 13 is a diagram of an illustrative window comparator in accordance with some embodiments.

FIG. 13 is a diagram of an illustrative comparator 82 in accordance with some embodiments. Comparator 82 of FIG. 13 can represent a horizontal comparator 82H and/or a vertical comparator 82V of FIG. 12. As shown in FIG. 13, comparator 82 can include a first comparator such as comparator subcircuit 90, a second comparator such as comparator subcircuit 92, and a logic gate such as logic NAND gate 94. Comparator subcircuit 90 may include a first (positive) input configured to receive high reference voltage Vref_hi, a second (negative) input configured to receive a subtraction value Vsub from a subtraction circuit (e.g., from subtraction circuit 62-H or 62-V), and an output coupled to logic NAND gate 94. Comparator subcircuit 92 may include a first (positive) input configured to receive the subtraction value Vsub, a second (negative) input configured to receive low reference voltage Vref_lo, and an output coupled to logic NAND gate 94. Logic NAND gate 94 may be configured to generate a comparator output signal comp_out at its output.

Figure 14:
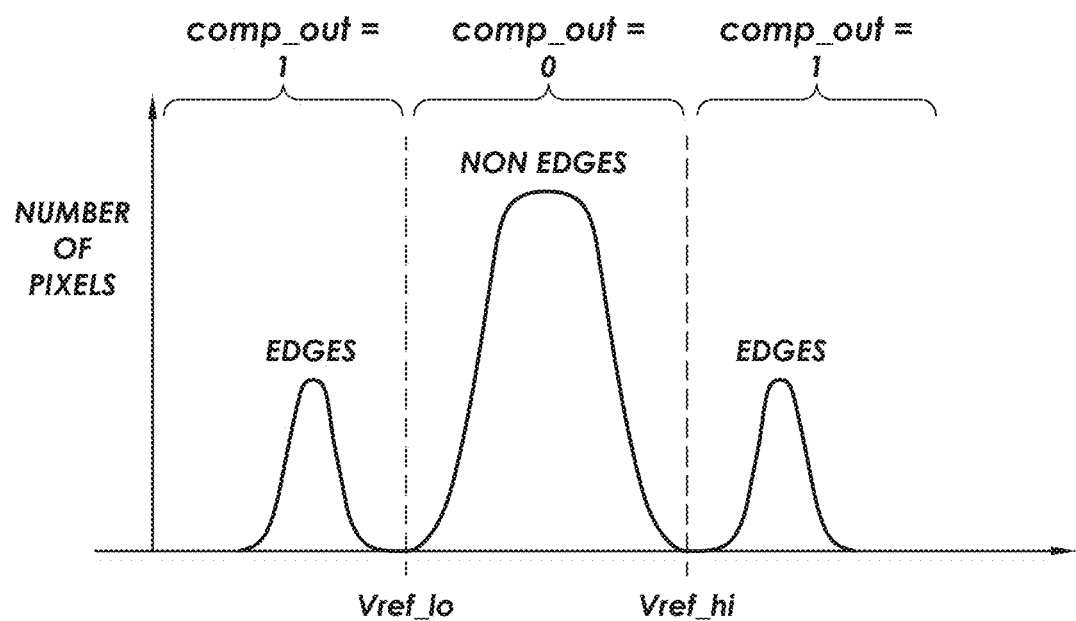
FIG. 14 is a diagram showing an exemplary distribution of pixels that can be output by the window comparator of FIG. 13 for edge detection in accordance with some embodiments.

FIG. 14 is a diagram showing an exemplary distribution of pixels that can be output by comparator 82 of FIG. 13 for edge detection. The voltage level of reference voltages Vref_lo and Vref_hi should be selected such that a majority of the pixel outputs will fall under the "non edge" category while a first small number of pixels falling below Vref_lo will be categorized as "edges" and while a second small number of pixels falling above Vref_hi will also be categorized as "edges." Any Vsub value below reference voltage Vref_lo will generate a corresponding comparator output signal comp_out equal to a logic one. Any Vsub value above reference voltage Vref_hi will generate a corresponding comparator output signal comp_out also equal to logic one. Any Vsub value greater than Vref_lo and less than Vref_hi will generate a corresponding comparator output signal comp_out equal to a logic zero. A comparator 82 configured and operated in this way is sometimes referred to as a window comparator. Such window comparator 82 can replace a high resolution ADC in an image sensor, which can dramatically improve readout speed while keeping power consumption low.

Figure 17:
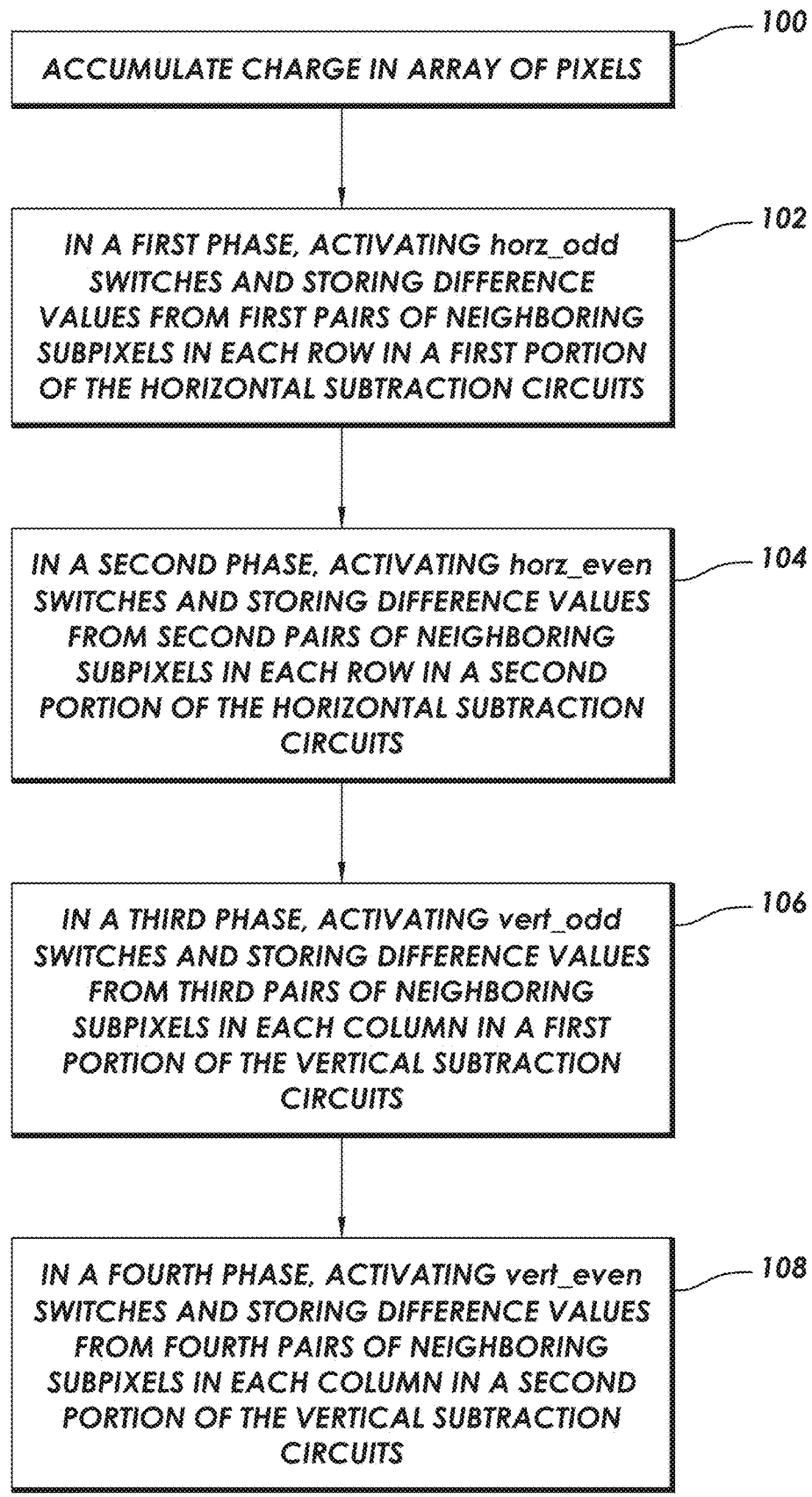
FIG. 17 is a flow chart of illustrative steps for operating an array of pixels of the type shown in FIGS. 7-14 in accordance with some embodiments.

FIG. 17 is a flow chart of illustrative steps for operating an array of pixels of the type described in FIGS. 7-14. In the operations of block 100, charge can be accumulated in the array of pixels 34 in response to impinging photons. In the operations of block 102 (sometimes referred to as the first phase), the horizontal odd switches horz_odd can be activated to store difference values from first pairs of neighboring subpixels in each row in a first portion of the horizontal subtraction circuits 62-H. This is shown in FIG. 8 where a first difference value associated with subpixels 60-1 and 60-2 is stored in horizontal subtraction circuit 62-H' and where a second difference value associated with subpixels 60-3 and 60-4 is stored in horizontal subtraction circuit 62-H". This subtraction scheme can be repeated across the array for remaining columns and all rows.

In the operations of block 104 (sometimes referred to as the second phase), the horizontal even switches horz_even can be activated to store difference values from second pairs of neighboring subpixels in each row in a second portion of the horizontal subtraction circuits 62-H. This is shown in FIG. 9 where a difference value associated with subpixels 60-2 and 60-3 is stored in horizontal subtraction circuit 62-H' and where a difference value associated with subpixels 60-2' and 60-3' is stored in horizontal subtraction circuit 62-H". This subtraction scheme can be repeated across the array for remaining rows and all columns.

In the operations of block 106 (sometimes referred to as the third phase), the vertical odd switches vert_odd can be activated to store difference values from third pairs of neighboring subpixels in each column in a first portion of the vertical subtraction circuits 62-V. This is shown in FIG. 10 where a difference value associated with subpixels 60-1 and 60-1' is stored in vertical subtraction circuit 62-V' and where a difference value associated with subpixels 60-2 and 60-2' is stored in vertical subtraction circuit 62-V". This subtraction scheme can be repeated across the array for remaining columns and all rows.

In the operations of block 108 (sometimes referred to as the fourth phase), the vertical even switches vert_even can be activated to store difference values from fourth pairs of neighboring subpixels in each column in a second portion of the vertical subtraction circuits 62-V. This is shown in FIG. 11 where a difference value associated with subpixels 60-1' and 60-1" is stored in vertical subtraction circuit 62-V' and where a difference value associated with subpixels 60-2' and 60-2" is stored in vertical subtraction circuit 62-V". This subtraction scheme can be repeated across the array for remaining rows and all columns. After these four phases, the readout circuitry described in connection with FIG. 12 can be used to scan out the stored difference values in a sequential fashion.

Figure 15:
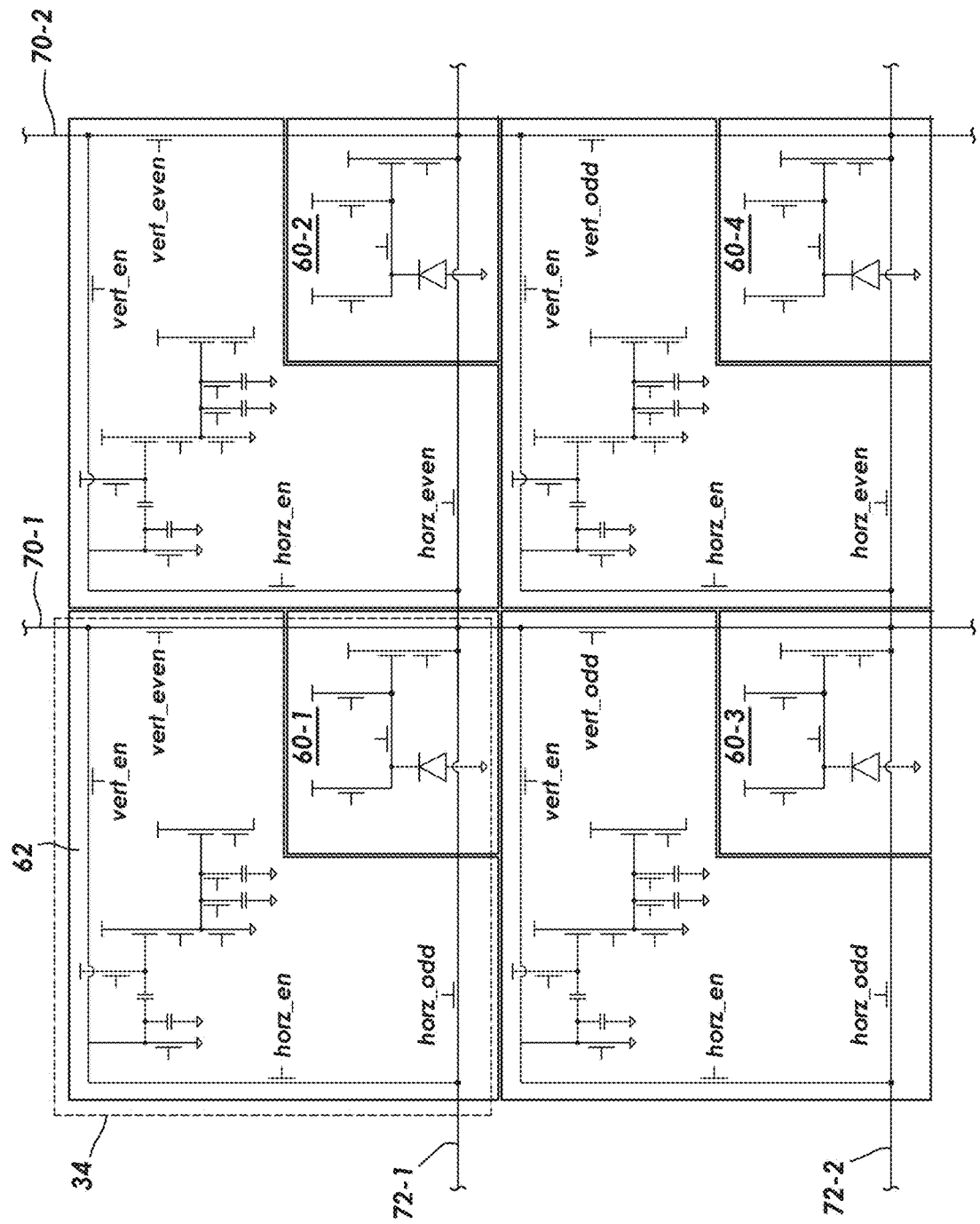
FIG. 15 is a circuit diagram showing an array of pixels each having a subpixel and one associated subtraction circuit in accordance with some embodiments.

The embodiment of FIG. 7 in which each pixel 34 includes one subpixel circuit 60 and two associated subtraction circuits 62-H and 62-V is illustrative. FIG. 15 shows another embodiment in which pixel 34 includes one subpixel circuit 60 and one subtraction circuit 62. In general, the term "pixel" can refer to or be defined herein as a pixel circuit that includes one or more subpixel portions 60 and one or more subtraction circuit portions 62. The example of FIG. 15 shows a first row of pixels 34 having subpixels 60-1 and 60-2 and a second row of pixels 34 having subpixels 60-3 and 60-4.

Subpixels 60-1 and 60-2 in the first row of FIG. 15 may be coupled to a first horizontal (row) signal line 72-1, whereas subpixels 60-3 and 60-4 in the second row in FIG. 15 may be coupled to a second horizontal (row) signal line 72-2. Switches horz_odd and horz_even may be disposed along the first horizontal signal line 72-1 to couple together the subtraction circuits 62 in the first row in an alternating fashion. Switches horz_odd and horz_even may also be disposed along the second horizontal signal line 72-2 to couple together the subtraction circuits 62 in the second row in an alternating fashion.

Subpixels 60-1 and 60-3 in the first column of FIG. 15 may be coupled to a first vertical (column) signal line 70-1, whereas subpixels 60-2 and 60-4 in the second column in FIG. 15 may be coupled to a second vertical (column) signal line 70-2. Switches vert_odd and vert_even may be disposed along the first vertical signal line 70-1 to couple together the subtraction circuits 62 in the first column in an alternating fashion. Switches vert_odd and vert_even may also be disposed along the second vertical signal line 70-2 to couple together the subtraction circuits 62 in the second column in an alternating fashion.

The subtraction circuit 62 associated with subpixel 60-1 may have an input node that is selectively coupled to horizontal signal line 72-1 via a first horizontal enable switch horz_en and that is selectively coupled to vertical signal line 70-1 via a first vertical enable switch vert_en. The subtraction circuit 62 associated with subpixel 60-2 may have an input node that is selectively coupled to horizontal signal line 72-1 via a second horz_en (horizontal enable) switch and that is selectively coupled to vertical signal line 70-2 via a second vert_en (vertical enable) switch. The subtraction circuit 62 associated with subpixel 60-3 may have an input node that is selectively coupled to horizontal signal line 72-2 via a third horz_en switch and that is selectively coupled to vertical signal line 70-1 via a third vert_en switch. The subtraction circuit 62 associated with subpixel 60-4 may have an input node that is selectively coupled to horizontal signal line 72-2 via a fourth horz_en switch and that is selectively coupled to vertical signal line 70-2 via a fourth vert_en switch.

The array of FIG. 15 showing a 2×2 array of four pixels 34 is illustrative and can be repeated across in the row-wise and column-wise directions. In general, the image sensor can include pixels 34 arranged into any number of rows and any number of columns (e.g., the image sensor array can include hundreds or thousands of rows and hundreds or thousands of columns). Each row of pixels can be coupled to a horizontal (row) signal line 72 with interspersed horz_even and horz_odd switches selectively coupling together neighboring subtraction circuits 62. Each column of pixels can be coupled to a vertical (column) signal line 70 with interspersed vert_even and vert_odd switches selectively coupling together neighboring subtraction circuits 62. The even and odd switches can be driven in a one-hot fashion (e.g., only one of switches horz_even, horz_odd, vert_even, and vert_odd can be activated at any point in time).

A pixel array of the type shown in FIG. 15 can be configured to perform a global difference and storage operation by performing a continuous network of subtractions with moving boundaries via a four phase operation. In a first phase, switches horz_odd and horz_en are turned on. In a second phase, the horz_even and horz_en switches are turned on. In a third phase, the vert_odd and vert_en switches are turned on. In a fourth phase, the vert_even and vert_en are turned on. These four phases can be performed in any order until a subtraction (difference) value from all horizontal neighboring subpixels and all vertical neighboring subpixels haven been stored in a corresponding memory capacitor (see, e.g., C3 in FIG. 5) of each horizontal subtraction circuit 62. If desired, subtraction values for the vertical edges can be computed prior to the horizontal edges.

Figure 16:
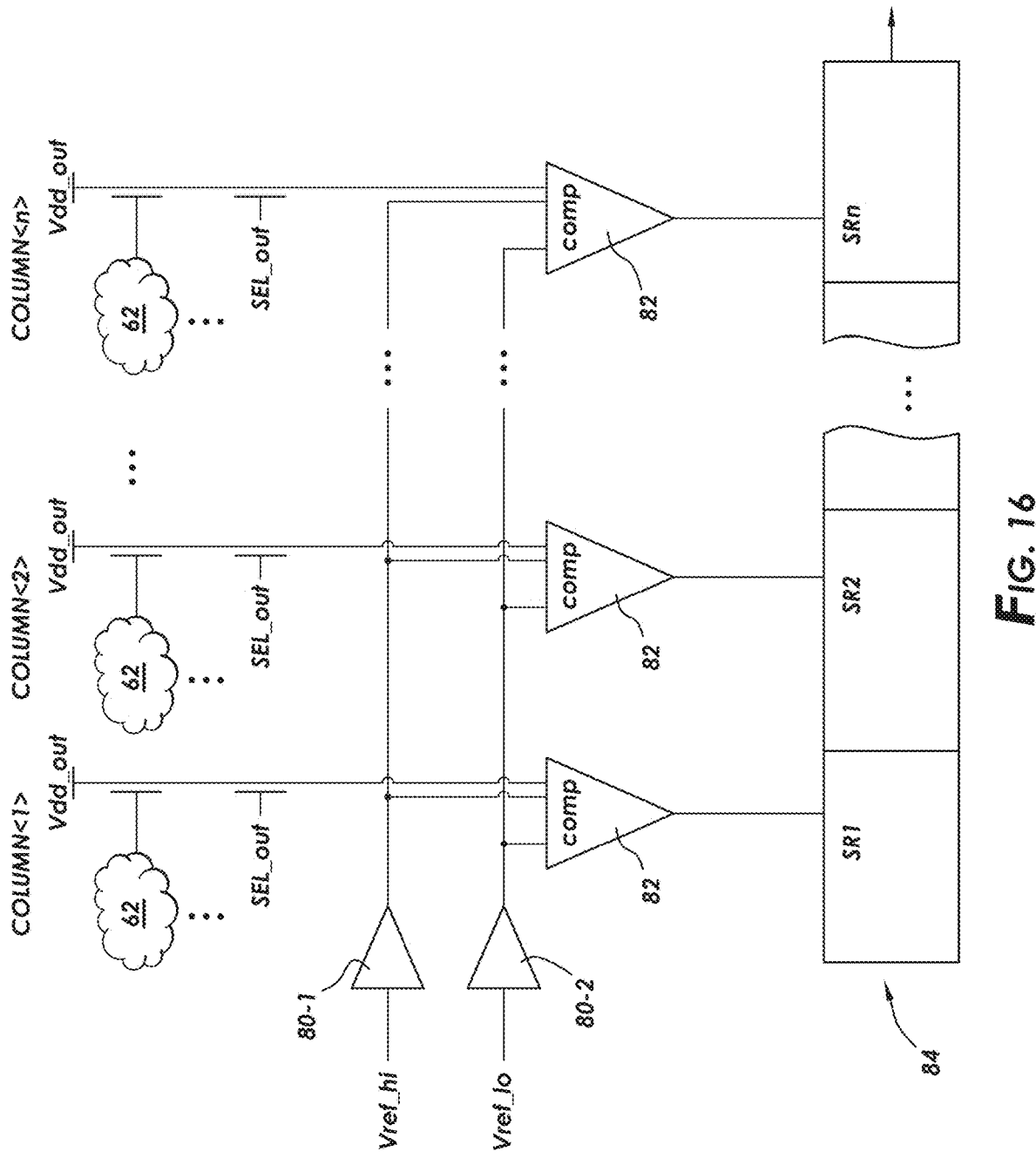
FIG. 16 is a diagram of illustrative edge detection readout circuitry configured to operate with the array of pixels of the type shown in FIG. 15 in accordance with some embodiments.

FIG. 16 is a diagram of illustrative edge detection readout circuitry configured to operate with the array of pixels 34 of the type shown in FIG. 15 in accordance with some embodiments. As shown in FIG. 16, the edge detection readout circuitry can include a plurality of comparator circuits such as comparators 82, voltage buffers such as reference voltage buffers 80-1 and 80-2, and a shift register circuit such as shift register. Voltage buffer 80-1 may be configured to output (drive) a high reference voltage Vref_hi, whereas voltage buffer 80-2 may be configured to output (drive) a low reference voltage Vref_lo. The voltage levels of Vref_hi and Vref_lo should be selected in the way described in connection with FIG. 14.

Each comparator 82 may have a first input configured to receive difference values from multiple subtraction circuits 62 in a sequential fashion, a second input configured to receive reference voltage Vref_hi from voltage buffer 80-1, a third input configured to receive reference voltage Vref_lo from voltage buffer 80-2, and an output coupled to a respective register in shift register 84. Configured in this way, each comparator 82 can receive the stored difference values from subtraction circuits 62 in a corresponding column, reference voltage Vref_hi, and reference voltage Vref_lo. Comparator 82 can be a window comparator of the type shown in FIG. 13. Configured in this way, comparator output values being shifted out of shift register 84 that are equal to a logic "1" will be indicative of the presence of a detected edge whereas values that are equal to a logic "0" will be indicative of the lack of a detected edge. Detecting and reading out edge information in this way does not require any high resolution analog-to-digital converters and complex digital processing and can thus enable operations of up to 1000 frames per second or more.

Various embodiments of the edge detection sensor are included. An aspect of the disclosure provides a sensor that includes: an array of pixels arranged in rows and columns, where each pixel in the array of pixels comprises a subpixel circuit, a first subtraction circuit, and a second subtraction circuit; a first horizontal signal line coupled to a first row of pixels in the array; first horizontal odd switches disposed along the first horizontal signal line, wherein the first horizontal odd switches are activated in a first phase during which difference values from pairs of neighboring subpixels in the first row are stored in a first portion of the first subtraction circuits in the first row; and first horizontal even switches disposed along the first horizontal signal line, wherein the first horizontal even switches are activated in a second phase during which difference values from pairs of neighboring subpixels in the first row are stored in a second portion of the first subtraction circuits, different than the first portion of the first subtraction circuits, in the first row. The sensor can further include: a second horizontal signal line coupled to a second row of pixels in the array; second horizontal odd switches disposed along the second horizontal signal line, where the second horizontal odd switches are activated in the first phase during which difference values from pairs of neighboring subpixels in the second row are stored in a first portion of the first subtraction circuits in the second row; and second horizontal even switches disposed along the second horizontal signal line, where the second horizontal even switches are activated in the second phase during which difference values from pairs of neighboring subpixels in the second row are stored in a second portion of the first subtraction circuits, different than the first portion of the first subtraction circuits, in the second row.

The sensor can further include a first vertical signal line coupled to a first column of pixels in the array; first vertical odd switches disposed along the first vertical signal line, where the first vertical odd switches are activated in a third phase during which difference values from pairs of neighboring subpixels in the first column are stored in a first portion of the second subtraction circuits in the first column; and first vertical even switches disposed along the first vertical signal line, where the first vertical even switches are activated in a fourth phase during which difference values from pairs of neighboring subpixels in the first column are stored in a second portion of the second subtraction circuits, different than the first portion of the second subtraction circuits, in the first column. The sensor can further include: a second vertical signal line coupled to a second column of pixels in the array; second vertical odd switches disposed along the second vertical signal line, wherein the second vertical odd switches are activated in the third phase during which difference values from pairs of neighboring subpixels in the second column are stored in a first portion of the second subtraction circuits in the second column; and second vertical even switches disposed along the second vertical signal line, wherein the second vertical even switches are activated in the fourth phase during which difference values from pairs of neighboring subpixels in the second column are stored in a second portion of the second subtraction circuits, different than the first portion of the second subtraction circuits, in the second column.

The sensor can further include: a first comparator circuit having a first input coupled to the first subtraction circuits in a first column of pixels in the array, a second input configured to receive a first reference voltage, and a third input configured to receive a second reference voltage that is less than the first reference voltage; a second comparator circuit having a first input coupled to the second subtraction circuits in the first column of pixels in the array, a second input configured to receive the first reference voltage, and a third input configured to receive the second reference voltage; a first shift register coupled to an output of the first comparator circuit; a second shift register coupled to an output of the second comparator circuit; and a logic OR gate having a first input coupled to the first shift register and having a second input coupled to the second shift register.

An aspect of the disclosure provides a method that includes: accumulating charge in an array of pixels arranged in rows and columns, where each pixel in the array of pixels comprises a subpixel circuit, a first subtraction circuit, and second subtraction circuit; activating horizontal odd switches and storing difference values from pairs of neighboring subpixels in a first row of pixels in a first portion of the first subtraction circuits in the first row in a first phase; and outputting an edge image based on the stored difference values. The method can further include: activating horizontal even switches and storing difference values from pairs of neighboring subpixels in the first row of pixels in a second portion of the first subtraction circuits in the first row during a second phase; activating vertical odd switches and storing difference values from pairs of neighboring subpixels in a first column of pixels in a first portion of the second subtraction circuits in the first column during a third phase; and activating vertical even switches and storing difference values from pairs of neighboring subpixels in the first column of pixels in a second portion of the second subtraction circuits in the first column during a fourth phase.

An aspect of the disclosure provides a sensor that includes a pixel having a subpixel circuit and a subtraction circuit, where: the subpixel circuit in each pixel in the array comprises a photodiode, a charge transfer transistor coupled between the photodiode and a floating diffusion node, a reset transistor coupled to the floating diffusion node, a source follower transistor having a gate terminal coupled to the floating diffusion node, and a row select transistor coupled in series with the source follower transistor; the subpixel is coupled to the subtraction circuit via a horizontal odd switch; the subpixel is coupled to a subpixel circuit of a neighboring pixel in a same row via a horizontal even switch; the subpixel is coupled to the subtraction circuit via a vertical even switch; and the subpixel is coupled to a subpixel circuit of a neighboring pixel in a same column via a vertical odd switch. The sensor can further include a horizontal enable switch coupled between the horizontal odd switch and the subtraction circuit and a vertical enable switch coupled between the vertical even switch and the subtraction circuit. During a first phase, the horizontal odd switch and the horizontal enable switch can be activated. During a second phase, the horizontal even switch and the horizontal enable switch can be activated. During a third phase, the vertical odd switch and the vertical enable switch can be activated. During a fourth phase, the vertical even switch and the vertical enable switch can be activated.

The foregoing is merely illustrative and various modifications can be made to the described embodiments. The foregoing embodiments may be implemented individually or in any combination.

What is claimed is:

1. A sensor comprising:
an array of pixels arranged in rows and columns, wherein each pixel in the array of pixels comprises a subpixel circuit, a first subtraction circuit, and a second subtraction circuit;
a first horizontal signal line coupled to a first row of pixels in the array;
first horizontal odd switches along the first horizontal signal line, wherein the first horizontal odd switches are configured to activate in a first phase during which difference values from first pairs of neighboring subpixels in the first row are stored in a first portion of the first subtraction circuits in the first row; and
first horizontal even switches along the first horizontal signal line, wherein the first horizontal even switches are configured to activate in a second phase during which difference values from second pairs of neighboring subpixels in the first row are stored in a second portion of the first subtraction circuits, different than the first portion of the first subtraction circuits, in the first row.

2. The sensor of claim 1, wherein the subpixel circuit in each pixel in the array comprises:
a photodiode;
a charge transfer transistor coupled between the photodiode and a floating diffusion node;
a reset transistor coupled to the floating diffusion node;
a source follower transistor having a gate terminal coupled to the floating diffusion node; and
a row select transistor coupled in series with the source follower transistor.

3. The sensor of claim 1, wherein the first subtraction circuit comprises:
a first precharge transistor coupled to an input node of the first subtraction circuit;
a sampling capacitor having a first terminal coupled to the input node of the first subtraction circuit and having a second terminal;
a reset transistor coupled to the second terminal of the sampling capacitor;
a source follower transistor having a gate terminal coupled to the second terminal of the sampling capacitor;
a row select transistor coupled in series with the source follower transistor;
a second precharge transistor coupled in series with the row select transistor;
a storage capacitor coupled to a given node between the row select transistor and the second precharge transistor; and
a capacitor selection transistor coupled between the given node and the storage capacitor.

4. The sensor of claim 1, further comprising:
a second horizontal signal line coupled to a second row of pixels in the array;
second horizontal odd switches along the second horizontal signal line, wherein the second horizontal odd switches are configured to activate in the first phase during which difference values from third pairs of neighboring subpixels in the second row are stored in a first portion of the first subtraction circuits in the second row; and
second horizontal even switches along the second horizontal signal line, wherein the second horizontal even switches are configured to activate in the second phase during which difference values from fourth pairs of neighboring subpixels in the second row are stored in a second portion of the first subtraction circuits, different than the first portion of the first subtraction circuits, in the second row.

5. The sensor of claim 1, further comprising:
a first vertical signal line coupled to a first column of pixels in the array;
first vertical odd switches along the first vertical signal line, wherein the first vertical odd switches are configured to activate in a third phase during which difference values from third pairs of neighboring subpixels in the first column are stored in a first portion of the second subtraction circuits in the first column; and
first vertical even switches along the first vertical signal line, wherein the first vertical even switches are configured to activate in a fourth phase during which difference values from fourth pairs of neighboring subpixels in the first column are stored in a second portion of the second subtraction circuits, different than the first portion of the second subtraction circuits, in the first column.

6. The sensor of claim 5, further comprising:
a second vertical signal line coupled to a second column of pixels in the array;
second vertical odd switches along the second vertical signal line, wherein the second vertical odd switches are configured to activate in the third phase during which difference values from fifth pairs of neighboring subpixels in the second column are stored in a first portion of the second subtraction circuits in the second column; and
second vertical even switches along the second vertical signal line, wherein the second vertical even switches are configured to activate in the fourth phase during which difference values from sixth pairs of neighboring subpixels in the second column are stored in a second portion of the second subtraction circuits, different than the first portion of the second subtraction circuits, in the second column.

7. The sensor of claim 1, further comprising:
a first comparator circuit having a first input coupled to the first subtraction circuits in a first column of pixels in the array, a second input configured to receive a first reference voltage, and a third input configured to receive a second reference voltage that is less than the first reference voltage.

8. The sensor of claim 7, further comprising:
a second comparator circuit having a first input coupled to the second subtraction circuits in the first column of pixels in the array, a second input configured to receive the first reference voltage, and a third input configured to receive the second reference voltage.

9. The sensor of claim 8, further comprising:
a first shift register coupled to an output of the first comparator circuit; and
a second shift register coupled to an output of the second comparator circuit.

10. The sensor of claim 9, further comprising:
a logic OR gate having a first input coupled to the first shift register and having a second input coupled to the second shift register.

11. The sensor of claim 7, wherein the first comparator circuit comprises:
a first comparator subcircuit having a first input configured to receive the first reference voltage and having a second input coupled to the first subtraction circuits in the first column of pixels in the array;
a second comparator subcircuit having a first input configured to receive the second reference voltage and having a second input coupled to the second input of the first comparator subcircuit; and
a logic NAND gate having a first input coupled to an output of the first comparator subcircuit and having a second input coupled to an output of the second comparator subcircuit.

12. A method of operating a sensor, comprising:
accumulating charge in an array of pixels arranged in rows and columns, wherein each pixel in the array of pixels comprises a subpixel circuit, a first subtraction circuit, and a second subtraction circuit;
in a first phase, activating horizontal odd switches and storing difference values from first pairs of neighboring subpixels in a first row of pixels in a first portion of the first subtraction circuits in the first row;
in a second phase, activating horizontal even switches and storing difference values from second pairs of neighboring subpixels in the first row of pixels in a second portion of the first subtraction circuits in the first row; and
outputting an edge image based on the stored difference values.

13. The method of claim 12, further comprising:
in a third phase, activating vertical odd switches and storing difference values from third pairs of neighboring subpixels in a first column of pixels in a first portion of the second subtraction circuits in the first column.

14. The method of claim 13, further comprising:

in a fourth phase, activating vertical even switches and storing difference values from fourth pairs of neighboring subpixels in the first column of pixels in a second portion of the second subtraction circuits in the first column.

15. The method of claim 14, further comprising:

with a first comparator, receiving the stored difference values from the first subtraction circuits in the first column, a first reference voltage, and a second reference voltage;

with a second comparator, receiving the stored difference values from the second subtraction circuits in the first column, the first reference voltage, and the second reference voltage;

with a first shift register, receiving comparator output values from the first comparator; and with a second shift register, receiving comparator output values from the second comparator.

16. A sensor comprising:

a pixel that includes a subpixel circuit and a subtraction circuit, wherein the subpixel circuit comprises a photodiode, a charge transfer transistor coupled between the photodiode and a floating diffusion node, a reset transistor coupled to the floating diffusion node, a source follower transistor having a gate terminal coupled to the floating diffusion node, and a row select transistor coupled in series with the source follower transistor, the subpixel is coupled to the subtraction circuit via a horizontal odd switch, the subpixel is coupled to a subpixel circuit of a neighboring pixel in a same row via a horizontal even switch, the subpixel is coupled to the subtraction circuit via a vertical even switch, and the subpixel is coupled to a subpixel circuit of a neighboring pixel in a same column via a vertical odd switch.

17. The sensor of claim 16, wherein the subtraction circuit comprises:

a first precharge transistor coupled to an input node of the subtraction circuit;

a sampling capacitor having a first terminal coupled to the input node of the subtraction circuit and having a second terminal;

an additional reset transistor coupled to the second terminal of the sampling capacitor;

an additional source follower transistor having a gate terminal coupled to the second terminal of the sampling capacitor;

an additional row select transistor coupled in series with the additional source follower transistor;

a second precharge transistor coupled in series with the additional row select transistor;

a storage capacitor coupled to a given node between the additional row select transistor and the second precharge transistor; and a capacitor selection transistor coupled between the given node and the storage capacitor.

18. The sensor of claim 16, further comprising:

a horizontal enable switch coupled between the horizontal odd switch and the subtraction circuit; and a vertical enable switch coupled between the vertical even switch and the subtraction circuit, wherein in a first phase, the horizontal odd switch and the horizontal enable switch are configured to activate, in a second phase, the horizontal even switch and the horizontal enable switch are configured to activate, in a third phase, the vertical odd switch and the vertical enable switch are configured to activate, and in a fourth phase, the vertical even switch and the vertical enable switch are configured to activate.

19. The sensor of claim 16, further comprising:

a comparator having a first input coupled to the subtraction circuit, a second input configured to receive a first reference voltage, and a third input configured to receive a second reference voltage that is different than the first reference voltage; and a shift register having an input coupled to the comparator.

* * * * *